(12) United States Patent
Vandelinde

(10) Patent No.: US 8,997,903 B2
(45) Date of Patent: Apr. 7, 2015

(54) MOTORIZED LOAD ASSISTANCE FOR WHEELBARROWS

(71) Applicant: Gary Vandelinde, Lexington, KY (US)

(72) Inventor: Gary Vandelinde, Lexington, KY (US)

(*) Notice: Subject to any disclaimer, the term of this patent is extended or adjusted under 35 U.S.C. 154(b) by 0 days.

(21) Appl. No.: 13/949,628

(22) Filed: Jul. 24, 2013

(65) Prior Publication Data

US 2015/0027794 A1 Jan. 29, 2015

(51) Int. Cl.
*B62D 51/04* (2006.01)
*B62B 5/00* (2006.01)

(52) U.S. Cl.
CPC .................................... *B62B 5/0066* (2013.01)

(58) Field of Classification Search
USPC ............... 180/19.1, 19.3, 65.31, 11, 15, 14.1; 280/47.31
See application file for complete search history.

(56) References Cited

U.S. PATENT DOCUMENTS

| | | | |
|---|---|---|---|
| 3,791,470 A | 2/1974 | Baddore et al. | |
| 4,589,508 A | 5/1986 | Hoover et al. | |
| 4,640,520 A | 2/1987 | Wing et al. | |
| 4,767,128 A | 8/1988 | Terhune | |
| 5,211,254 A | 5/1993 | Harris, III et al. | |
| 5,305,843 A | 4/1994 | Armstrong | |
| 5,489,000 A | 2/1996 | Hillbohm | |
| 6,065,555 A | 5/2000 | Yuki et al. | |
| 6,173,799 B1 * | 1/2001 | Miyazaki et al. | 180/19.3 |
| 6,220,622 B1 | 4/2001 | Garcia | |
| 6,241,276 B1 | 6/2001 | Wilburn | |
| 6,470,981 B1 * | 10/2002 | Sueshige et al. | 180/19.3 |
| 6,820,880 B2 * | 11/2004 | Benton et al. | 280/47.31 |
| 7,775,306 B1 | 8/2010 | Adkins | |
| 2003/0015852 A1 | 1/2003 | Swift | |
| 2007/0079998 A1 * | 4/2007 | Walter | 180/19.1 |
| 2008/0246240 A1 | 10/2008 | Jimenez | |
| 2009/0178864 A1 * | 7/2009 | Robinson et al. | 180/19.3 |
| 2012/0146386 A1 | 6/2012 | Rowlands | |

* cited by examiner

*Primary Examiner* — Anne Marie Boehler
*Assistant Examiner* — Marlon Arce
(74) *Attorney, Agent, or Firm* — Stockwell & Smedley, PSC

(57) ABSTRACT

The present invention provides a device or apparatus for assisting in the operation of a wheelbarrow having a tray, handles and at least one front wheel. The present device may generally include a motor, a power/fuel source, a drive wheel and a drive mechanism for rotationally coupling the drive motor to the drive wheel, the drive wheel able to contact the front wheel of the wheelbarrow in a direct wheel-on-wheel engagement when the present device is attached to the underside of the wheelbarrow tray. The present device may be slidingly attached to the wheelbarrow, such as by one or more slides, to permit its movement forward and backward for the drive wheel to engage or disengage the front wheel. The present invention further includes the present device attached to a wheelbarrow or tray, and methods for assembling and operating the device and attaching it to a wheelbarrow or tray.

27 Claims, 7 Drawing Sheets

MOTORIZED LOAD ASSISTANCE FOR WHEELBARROWS

BACKGROUND

1. Field of the Invention

The present invention relates to apparatuses and methods that assist in the movement of a wheelbarrow, particularly for heavy loads and/or on a hill or incline.

2. Related Art

The basic concept of a wheelbarrow to carry loads over a distance has been in existence in various forms since at least the Middle Ages. The design of many classic or standard wheelbarrows in use today typically include rear supports, two arms or handles, at least one wheel, and a tray for holding the load. A typical wheelbarrow may also include various support structures and wheel-mounting pieces, such as an axle, etc., depending on the particular design and construction. The tray (also referred to as a bed or pan) is typically open on top and has a bottom wall and upward-extending front, back and/or side walls that contain and hold the load and keep it from spilling when the wheelbarrow is an upright position. The term "upright" in reference to a wheelbarrow means having the large opening on top of the tray facing generally upward away from the ground. The two arms or handles typically extend rearward from the back of the wheelbarrow for grabbing, lifting, turning, maneuvering, etc., by the hands of a user. The rear supports typically extend downward from the tray closer to the back of the wheelbarrow and may be attached, fastened, etc., to the tray itself or to the arms/handles.

At least one wheel is typically located near the front of the wheelbarrow and is held in place by attachment, connection, etc., of its wheel axle to the wheelbarrow. However, the wheel axle may be freely or fixedly connected to the wheelbarrow in a number of different ways. For example, the two rearwardly extending arms or handles may also have forward portions that extend out in a forward direction in front of the wheelbarrow tray. With these wheelbarrow designs, it is common for a single front wheel to be positioned between, and connected to, the forward portions of the arms or handles in front of the wheelbarrow tray. The front wheel axle may be held in place by wheel mounts fastened to the arms/handles or by insertion of the wheel axle through holes in the arms/handles themselves with additional wheel-mounting hardware. There may also be additional wheel supports that bridge from the tray to the forward portions of the arms/handles to provide additional strength. A cross support(s) may also be provided between corresponding portions of the two rear supports. Many other wheelbarrow designs exist as well. For example, instead of mounting the wheel axle to the arms or handles, the front wheel may be held in place by separate wheel-mounting structures that extend down from the wheelbarrow tray. As another example, a frame, which may include the rear supports, the arms/handles, and/or forward wheel-mounting structures, may be attached, connected, etc., to the wheelbarrow tray. With each of these classic designs, additional front support(s) may also be present that bridge between the tray and the arms/handles or frame near the front wheel(s).

In a resting state, the front wheel(s) and rear supports of a typical wheelbarrow will rest on the ground and share in supporting the combined weight of the wheelbarrow and its load (if any). The bottom portions of the downwardly extending rear supports, or one or more wheels, feet, etc., at the bottom of the rear supports, will contact the ground directly. When the back of a wheelbarrow is lifted off the ground by a user lifting up on the rearwardly extending handles, these rear supports are lifted off the ground, but the at least one front wheel of the wheelbarrow maintains contact with the ground and transitions from sharing the weight of the wheelbarrow (and load) with the rear supports to bearing most or all of its weight. By holding the handles in an elevated position and pushing them forward (or pulling them backward), a user may cause movement of the wheelbarrow over a distance. During movement, with the rear supports lifted off the ground, the at least one front wheel of the wheelbarrow will continue to bear the weight of the wheelbarrow (and its load) as a result of the front wheel(s) rotating and maintaining contact with the ground over the distance.

One of the main limitations of the classic wheelbarrow is the ability to move heavy loads especially on a hill or incline. Even a physically strong user is limited in the amount of weight they are able to balance, turn and push/pull over a distance with a standard wheelbarrow carrying a heavy load. This difficulty is even greater when a heavy load is carried (i.e., pushed/pulled) uphill against gravity. Indeed, a user may be able to move a load in a wheelbarrow over level ground but not be able to transport the same load uphill due to the added effects of gravity.

The placement of a motor on the underside of a wheelbarrow to assist in moving heavy loads by use of a drive chain engaged with the motor and a sprocket on the front wheel axle of the wheelbarrow has been described. However, these prior designs have a number of drawbacks. The use of a drive chain connected to a sprocket on a front wheel axle makes it difficult to reversibly engage/disengage the drive motor and drive chain from the front wheel axle of the wheelbarrow during use. Furthermore, many prior motorized wheelbarrow designs require the motor and/or drive chain to be positioned off to one side of a front-to-back center plane of the wheelbarrow, which may contribute to a weight imbalance for the user that may make the wheelbarrow difficult to control and maneuver, especially when emptying a load. This off-center (weight-imbalanced) placement of the motor and/or drive chain may be due to the motor and/or drive chain being in a side mounted arrangement or due to interference of a single front wheel that must be positioned within the front-to-back center plane of the wheelbarrow to maintain the side-to-side symmetry and weight balance of the wheelbarrow. A wheelbarrow having a balanced and symmetrical weight distribution is easier to maneuver and control during all aspects of its use, such as when transporting a load, dumping or emptying a load, etc. As a result, the drive chain and sprocket on the front wheel axle used with these prior designs (to impart rotation to the front wheel axle) must be positioned off to one side of this center plane of the wheelbarrow to access the front wheel axle sprocket that must be positioned off to one side of the centered front wheel. Yet another limitation with these prior designs is that a longer drive chain is needed to reach from the drive motor to the front wheel axle, which adds extra weight to the wheelbarrow that may further contribute to any weight imbalance. Having the drive chain mounted on the front wheel axle also raises safety issues for the user.

Therefore, what is needed in the art is an improved system, apparatus and method for facilitating the movement of a wheelbarrow and its load over a distance that is (i) relatively lightweight, (ii) "center-able" in general alignment with a single front wheel and the front-to-back center plane of the wheelbarrow to maintain its symmetry and weight balance, and/or (iii) easily and reversibly engaged/disengaged from the front wheel by a user during use.

SUMMARY

According to a first broad aspect of the present invention, an apparatus is provided for assisting in the operation of a wheelbarrow comprising: a frame having at least two main frame members including a first main frame member and a second main frame member; a drive wheel rotationally mounted on a drive wheel axle, the drive wheel axle being attached to the frame; a drive motor rotationally coupled to the drive wheel to impart rotation caused by the action of the drive motor to the drive wheel; and a power or fuel source for providing power or fuel to the drive motor, wherein the drive motor and the power or fuel source are each fixedly attached to the frame, and wherein the drive wheel and the drive motor are generally aligned in their attachment to the frame of the apparatus, such that the drive wheel is located closer to a front end of the apparatus than the drive motor.

According to a first broad aspect of the present invention, an apparatus is provided comprising a wheelbarrow tray, the wheelbarrow tray having a bottom wall and at least three side walls, wherein the bottom wall and the at least three side walls partially surround an interior containment space; and a movement assisting device slidably attached to the underside of the bottom wall of the wheelbarrow tray by one or more slides, the movement assisting device comprising: a frame having at least two main frame members including a first main frame member and a second main frame member; a drive wheel rotationally mounted on a drive wheel axle, the drive wheel axle being attached to the frame; a drive motor rotationally coupled to the drive wheel to impart rotation caused by the action of the drive motor to the drive wheel, the drive motor being fixedly attached to the frame; and a power or fuel source for providing power or fuel to the drive motor, the power or fuel source being fixedly attached to the frame, wherein each of the one or more slides comprises a sliding member and a stationary member, and wherein the sliding member of each slide is fixedly attached to the frame, and the stationary member of each slide is fixedly attached to the wheelbarrow tray.

According to a third broad aspect of the present invention, a wheelbarrow is provided comprising: a wheelbarrow tray, the wheelbarrow tray having a bottom wall and at least three side walls, wherein the bottom wall and the at least three side walls partially surround an interior containment space on the top side of the bottom wall for carrying a load; at least two handles attached to the wheelbarrow tray, each of the at least two handles having rearwardly extending portions for handling by a user; a front wheel mounted on a front wheel axle and attached to the wheelbarrow tray or the at least two handles via the front wheel axle; and a movement assisting device slidably attached to the underside of the bottom wall of the wheelbarrow tray by one or more slides, the movement assisting device comprising: a frame having at least two main frame members including a first main frame member and a second main frame member; a drive wheel rotationally mounted on a drive wheel axle, the drive wheel axle being attached to the frame; a drive motor rotationally coupled to the drive wheel to impart rotation to the drive wheel by the rotational action of the drive motor, the drive motor being fixedly attached to the frame; and a power or fuel source for providing power or fuel to the drive motor, the power or fuel source being fixedly attached to the frame, wherein each of the one or more slides comprises a sliding member and a stationary member, and wherein the sliding member of each slide is fixedly attached to the frame, and the stationary member of each slide is fixedly attached to the wheelbarrow tray.

According to a fourth broad aspect of the present invention, various methods for assembling, constructing, operating, etc., a wheelbarrow assisting device of the present invention are provided. Methods may include assembling, attaching, etc., the various components, frame members, etc., of a present device together in any manner described herein, and such components, members, etc., may be assembled, attached, etc., by any suitable method as described herein. Such methods may include attaching the device to a wheelbarrow, such as by coupling the sliding and stationary member(s) of one or more slides or by other means described herein, and causing rotational motion generated by a drive motor to be imparted to a drive wheel to exert a torque on a front wheel of the wheelbarrow due to the drive wheel being rotationally coupled to the drive motor and in direct wheel-on-wheel contact and engagement with the front wheel of the wheelbarrow. As described herein, such methods may further include regulating or controlling the operation of the motor, such as by operation of a control or switch, and/or by controlling the engagement or disengagement of the drive wheel with the front wheel of the wheelbarrow, such as by operating a slide adjuster.

DETAILED DESCRIPTION

The present invention relates to devices or apparatuses that may be mounted directly or indirectly on the underside of a wheelbarrow, such as on the underside of a main tray of a wheelbarrow, to assist a user during movement of the wheelbarrow over a distance. The present invention further provides wheelbarrows (or trays for wheelbarrows) with a movement-assisting device or apparatus of the present invention attached, mounted, etc., thereto. The present invention further provides methods for operating and assembling the devices or apparatuses of the present invention as well as attaching, mounting, etc., a movement-assisting device or apparatus of the present invention to a wheelbarrow or wheelbarrow tray. For purposes of the present invention, the term "wheelbarrow" refers to any wheelbarrow as understood in the art having at least a tray, a centered front wheel, and two rearwardly extending arms or handles. The centered front wheel of the wheelbarrow will generally be within a front-to-back center plane (defined below) of the wheelbarrow with the rotational axis of the centered front wheel generally perpendicular to the front-to-back center plane of the wheelbarrow. Unlike prior devices, a drive wheel of the present device and apparatus engages a centered front wheel of the wheelbarrow in a direct wheel-on-wheel arrangement to impart motion to the front wheel, which allows the present device and apparatus to achieve advantages not realized in the prior art.

Figure 1:
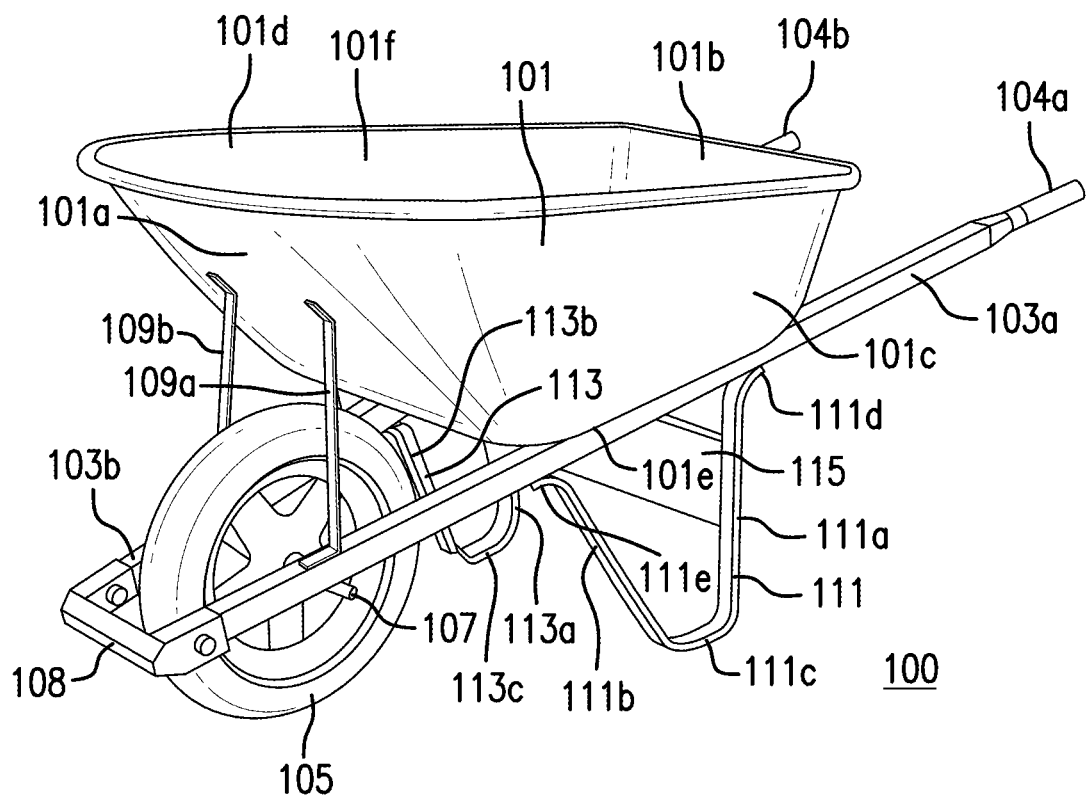
FIG. 1 shows an example of a classic wheelbarrow on the market today.

Since the movement-assisting device and apparatus of the present invention may be used with many standard wheelbarrow designs on the market today, a typical example of a wheelbarrow 100 with a single (centered) front wheel 105 is provided in FIG. 1. The wheelbarrow is shown in an upright position with a tray 101 having a front or distal side 101a, a back or proximal side 101b, a first (or left) lateral side 101c, a second (or right) lateral side 101d, and a bottom side 101e. The front side 101a, the back side 101b, the first lateral side 101c, and the second lateral side 101d each extend "upwardly" from the bottom side or wall 101e of the tray 101 to partially surround or enclose an interior containment space 101f above the bottom wall 101e and the inside of the front, back and side walls 101a-d of the tray 101 for holding a load (when the wheelbarrow is upright). Each of the sides of the wheelbarrow tray may also be referred to as a wall(s), and the front or distal side, the back or proximal side, the first (or left) lateral side, and the second (or right) lateral side may each be referred to as a side wall (or collectively as side walls) of the tray to distinguish them from the bottom wall(s) of the tray (since the side walls of the tray generally extend from the bottom wall(s) of the tray within a common "hemisphere" above, on top of, on one side of, etc., the bottom wall of the tray to partially enclose the interior containment space above the bottom wall of the tray). Although a wheelbarrow tray may have some variation in its shape and arrangement, the tray may generally comprise at least three sides or walls (and more commonly four or more sides) that extend upwardly from a bottom wall(s) of the tray when the wheelbarrow is in an upright position.

Two arms or handles 103a, 103b are shown attached (e.g., bolted or fastened) to the underside of the bottom wall 101e of the tray 101 and having rearwardly extending portions (perhaps with gripping portions 104a, 104b) for grabbing, holding, handling, etc., by the hands of a user. The front wheel 105 is shown positioned in front of the tray 101 and between the front portions of the two arms or handles 103a, 103b extending in front of the tray 101 with the axle of the front wheel 105 secured, attached, etc., by a pair of wheel mounts 107 (only one is visible) attached to the front portion (e.g., on the underside) of the respective arm or handle 103a, 103b.

Two rear supports including a first (or left) rear support 111 and a second (or right) rear support 113 are further shown in FIG. 1. The rear supports 111,112 along with the front wheel 105 keep the wheelbarrow 100 upright when the wheelbarrow 100 is in a resting state as shown in FIG. 1. The first rear support 111 having a forward descending portion 111a and a rear descending portion 111b linked at their bottoms by a bottom portion 111c is shown in the example in FIG. 1 with the bottom portion 111c contacting and resting on the ground in the resting state. Likewise, second rear support 113 having a forward descending portion 113a and a rear descending portion 113b linked at their bottoms by a bottom portion 113c is shown in FIG. 1 with the bottom portion 113c contacting and resting on the ground in the resting state. The first rear support 111 is shown attached to the tray 101 and the arm/handle 103a by a fastener attaching a first back lip 111d at or near the top of the rear descending portion 111a of the first rear support 111 and by a fastener attaching a first front lip 111e at or near the top of the forward descending portion 111b of the first rear support 111. Likewise, the second rear support 113 is attached to the tray 101 and the arm/handle 103b by a fastener attaching a second back lip at or near the top of the rear descending portion 113a of the second rear support 113 and by a fastener attaching a second front lip at or near the top of the forward descending portion 113b of the second rear support 113.

To provide additional rigidity and strength to the wheelbarrow 100 in FIG. 1, a distal end support 108 is also shown holding, connecting, etc., the two distal ends of the arms/handles 103a, 103b together. A first wheel support 109a is shown bridging from a point of attachment on the tray 101 to a point of attachment on the first arm or handle 103a, and a second wheel support 109b is shown bridging from a point of attachment on the tray 101 to a point of attachment on the second arm or handle 103b. The distal end support 108 may be attached at or near the distal ends of the two arms/handles 103a, 103b by one or more fasteners or another suitable method. Each of the first and second wheel supports 109a, 109b may also be attached to the tray 101 and to the respective arms/handles 103a, 103b by one or more fasteners or by another suitable method. A lateral cross support 115 is also shown oriented horizontally and bridging between, and attached at each of its side ends to, the rear descending portions 111a, 113a of the rear supports 111, 113, respectively.

Figure 2:
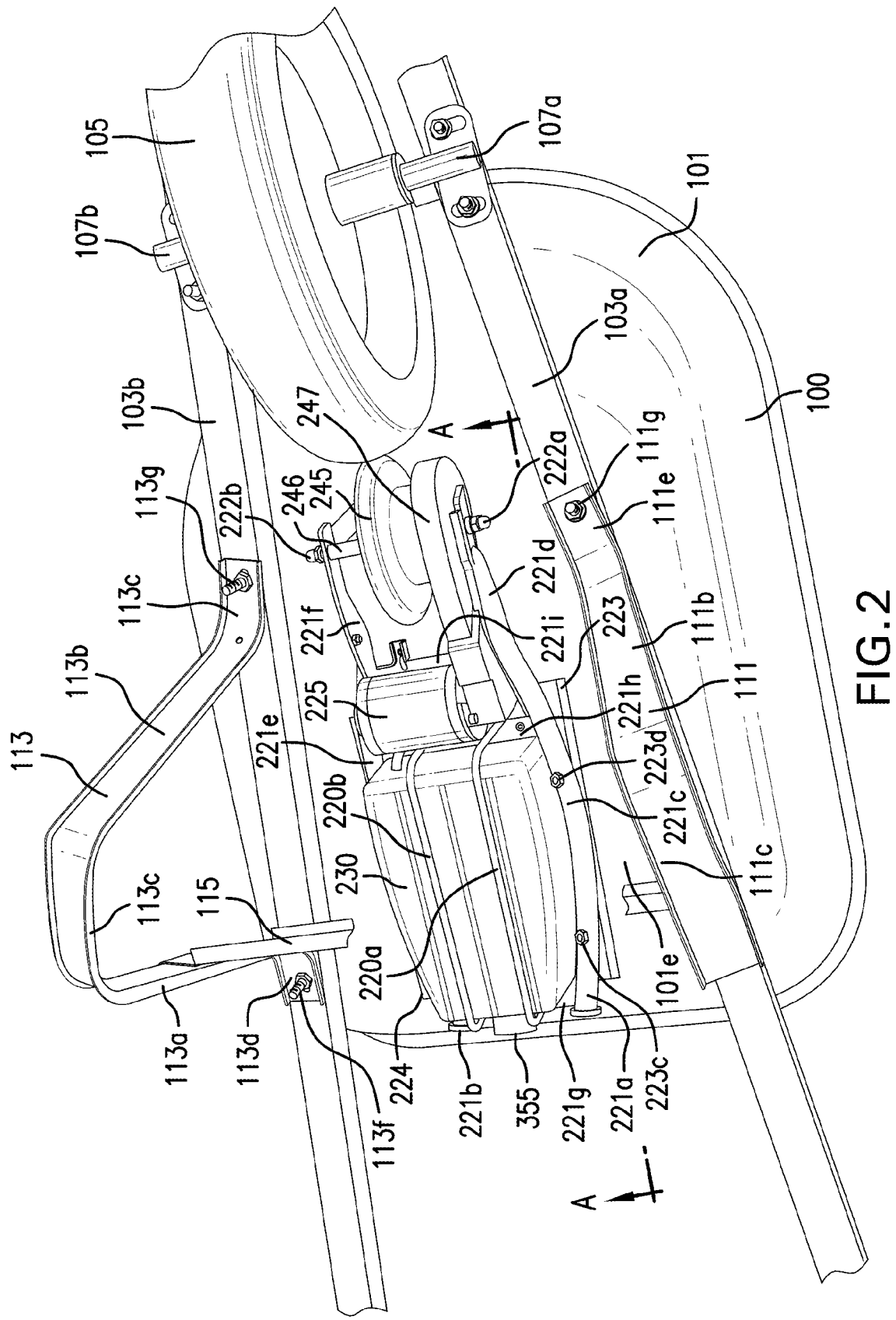
FIG. 2 shows a view of a wheelbarrow turned upside down to view a device embodiment of the present invention attached to the underside of the wheelbarrow tray.

The movement-assisting device or apparatus of the present invention may be added, mounted, attached, etc., to a wheelbarrow or wheelbarrow tray having a centered front wheel. For example, FIG. 2 shows an example of a device or apparatus of the present invention attached, mounted, etc., to the underside of the wheelbarrow 100 shown in FIG. 1. For purposes of the present invention, the teens "attached," "attaching," "mounted" and "mounting" may include both direct and indirect attachment, mounting, etc. A "direct" attachment, etc., generally includes direct contact and attachment by any suitable method between the two or more part(s), piece(s), member(s), spacer(s), component(s), etc., as the case may be, although such a "direct" attachment, etc., also includes attachment without literally direct contact if the two or more attached part(s), piece(s), member(s), spacer(s), component(s), etc., are separated only by minor intervening part(s), piece(s), material(s), etc., such as a fastener part(s), washer(s), etc., that are part of the manner of attachment, mounting, etc. On the other hand, an "indirect" attachment, etc., generally means attachment, etc., of two or more part(s), piece(s), member(s), spacer(s), component(s), etc., via other intervening part(s), part(s), piece(s), member(s), spacer(s), component(s), etc.

The wheelbarrow 100 is shown turned upside-down in FIG. 2 to display the attachment of a device embodiment of the present device to a wheelbarrow tray. As also shown in FIG. 1, the wheelbarrow 100 in FIG. 2 has a first (left) arm/handle 103a attached, mounted, etc., to the underside of the bottom wall 101e of the tray 101 by a first fastener 111f and a second fastener 111g. These fasteners also serve a dual function of securing the left rear support 111 to the underside of the wheelbarrow 100. The first fastener 111f secures the first front lip 111e of the left rear support 111 and the left arm/handle 103a (at a forward position) to the tray 101, whereas the second fastener 111g secures the first back lip 111d of the left rear support 111 and the left arm/handle 103a (at a rear position) to the tray 101. Likewise, a second (right) arm/handle 103b is shown attached, mounted, etc., to the underside of the bottom wall 101e of the tray 101 by a first fastener 113f and a second fastener 113g. The first fastener 113f secures the first front lip 113e of the right rear support 113 and the right arm/handle 103b (at a forward position) to the tray 101, whereas the second fastener 113g secures the first back lip 113d of the right rear support 113 and the right arm/handle 103b (at a rear position) to the tray 101. A centered front wheel 105 and its axle is shown mounted to a forward portion of the left arm or handle 103a (on its underside) and to a forward portion of the right arm/handle 103b (on its underside) by a first wheel mount 107a and a second wheel mount 107b, respectively.

A device or apparatus of the present invention is further shown in FIG. 2 mounted, attached, etc., to the underside of the tray 101 of the wheelbarrow 100. The term "underside" in reference to the bottom wall of a tray means below, or on the bottom side or surface of, the underside of the bottom wall of the tray being opposite a top side or surface of the bottom wall of the tray, the "top side" of the bottom wall of the tray being above, or on the top side or surface of, the bottom wall and within or facing the interior containment space of the tray for holding the load. However, the device or apparatus of the present invention may be mounted, etc., to the arms/handles of the wheelbarrow, possibly in addition to being mounted, etc., to the bottom wall of the tray. The device or apparatus of the present invention may include a frame 221, a motor 225, a power or fuel source 230, a drive mechanism (not visible), and a drive wheel 245.

The motor 225 is shown in FIG. 2 coupled to the drive wheel 245 via the drive mechanism, such as a chain drive, inside a chain cover 247. The drive wheel may also be referred to as a friction drive wheel to indicate its manner of contact and engagement with the front wheel of a wheelbarrow. The drive chain may be coupled to a sprocket mounted, etc., on the drive shaft extending out the side of the motor and to a sprocket mounted, etc., on the drive wheel axle 246 and/or on the side of the drive wheel 245. Although less preferred, a drive belt may also be used in place of a drive chain (not shown) that engages pulleys (instead of sprockets). Thus, rotational energy from the motor 225 may be imparted to the drive wheel axle 246 and/or the drive wheel 245 via the drive mechanism to cause its rotation, which may then cause (or help to cause) rotation of the centered front wheel 105 of the wheelbarrow 105 due to the direct contact and engagement between the drive wheel 245 and the centered front wheel 105. For purposes of the present invention, the phrase "mounted on" in reference to a rotating object, such as a wheel, sprocket, clutch, etc., associated with an axle or with a drive shaft of a motor shall mean that the respective axle or drive shaft is inserted through a hole or opening of the rotating object. However, such a rotating object "mounted on" a respective axle or drive shaft may be either fixedly attached, etc., to the axle or drive shaft, such that the axle or drive shaft and the rotating object rotate together, or freely attached, etc., to the axle or drive shaft, such that the axle or drive shaft and the rotating object can rotate independently. For these purposes of the present invention, the broader phrase "associated with" in reference to a rotating object, such as a wheel, sprocket, clutch, etc., that is functionally associated with an axle or a drive shaft of a motor shall mean that the rotating object is "mounted on" the respective axle or drive shaft (as defined above), or at least has its center axis of rotation generally aligned or co-linear with the axis of rotation of the respective axle or drive shaft (i.e., even if the rotating object is not directly "mounted on" the respective axle or drive shaft).

The motor 225 may preferably be an electric motor, and the power source 230 may preferably be any suitable battery, such as any suitable rechargeable battery. However, the motor 225 could also be a gas powered motor, and the power or fuel source 230 could be a gas tank or the like for holding fuel. The operation of the motor 225 may also be controlled by one or more switch(es) or controller(s) (not shown) that may be present on an arm or handle of the wheelbarrow or easy access by a user. Such a switch or controller may generally be electrically connected to the motor 225, and/or in direct or indirect wired or wireless communication with the motor 225 to control its operation. For example, the switch or controller may be connected via an electrical circuit(s) to the motor 225 and/or the power source 230 via one or more wires. One or more wires may also link the power source 230 to the motor 225 to provide power to the motor 225. As part of the circuit, the switch or controller may affect or control the amount of electricity, power, etc., provided to the motor 225 from the power source 230. This may be achieved by a user actuating the switch to block or allow the flow of electricity in the circuit. Alternatively or additionally, the switch or controller may operate by providing one or more level(s) of resistance to the flow of electricity that is ultimately delivered to the motor 225. For example, the switch may have different levels or settings (such as low, medium, high) to control the rate of operation of the motor 225 to cause different preset rates or speeds of rotation of the drive shaft (and thus the drive wheel 245). The switch may be capable of these different levels of resistance to control or affect the amount or level of power or current delivered to the motor 225 and thus its rate of rotation.

Alternatively, it is also conceivable that the switch or controller may transmit or send an input signal to the motor 225 and/or power source 230 (or another associated device) by wired or wireless communication to control the operation of the motor 225 and/or power source 230 to ultimately affect the rate of rotation of the motor 225. For these purposes, the switch/controller may derive its power to transmit or send the input signal from the power source 230 and/or another source. In response to the input signal, the operation of the motor 225 may then be controlled by the amount of current or power delivered to, or utilized by, the motor 225. According to these embodiments, one or more processors, logic controllers, receivers, circuits, etc., may be associated with, and/or part of, the motor 225 and/or power source 230 to receive the wired or wireless signal and carry out the instructions of the input signal, such as by changing the rate of rotation of the motor 225 and its drive shaft. These embodiments may be carried out with any suitable method(s) and/or electronic or wireless technologies known in the art.

Generally, the frame of a present device or apparatus may preferably be made of metal or metal alloy, such as steel, aluminum, etc., but other sufficiently durable materials, such as wood, wood-like or plastic materials, are also conceivably possible, as well as any suitable combinations thereof. The frame generally functions to hold the components and pieces of the device or apparatus together as well as to attach, secure, etc., the present device or apparatus to a wheelbarrow. The frame will also function to hold the drive wheel in place. In performing these structural and attachment functions, the frame may include a variety of different pieces, such as one or more main frame members and/or one or more lateral frame members as explained below, which may be fixedly connected together in different possible arrangements and orientations according to different embodiments of the present invention. For purposed of the present invention, the terms "fixedly" or "fixed" in reference to a form of attachment, etc., shall mean immovably or immovable as between the attached members or items; however, the terms "fixedly" or "fixed" in reference to a form of attachment, etc., may also include a manner of attachment, etc., that is reversible. Any suitable method of fastening, welding, soldering, brazing, gluing, etc., may be used to fixedly attach or connect the different frame members and pieces together. In general, the power/fuel source 230, drive motor 225 and drive wheel 245 may generally be placed in that order from back to front that may be generally aligned and/or approximately parallel with a frontto-back center axis (and/or approximately within a front-to-back center plane) of the wheelbarrow (or wheelbarrow tray). Described another way, the power/fuel source may be located closer to a back end of the apparatus or frame than the drive motor and the drive wheel, and the drive wheel may be located closer to a front end of the apparatus or frame than the drive motor and the power/fuel source. The terms "front end" and "back end" in reference to the present apparatus or its frame each refer simply to the furthest portion, reach or extent of the present apparatus or its frame in each of the opposing front and back directions, respectively. These opposing front and back directions refer to the orientation of the present device or apparatus in relation to a front-to-back axis of a wheelbarrow when the present device is properly attached, mounted, etc., to the bottom of such a wheelbarrow.

For purposes of the present invention, the phrases "generally aligned" or "in general alignment" may be used to describe the back-to-front or front-to-back positioning order of components of a present device or apparatus along an axis, although the phrases "generally aligned" or "in general alignment" in reference to the positioning order of components of a present device along an axis do not necessarily require precise alignment of those components as long as their positions are mainly in that order. However, a nearly symmetrical alignment may generally be preferred to avoid weight imbalance.

Although generally less preferred, however, it is also conceivable that the power or fuel source of a device or apparatus of the present invention may not be aligned with the drive motor and the drive wheel and may be positioned off to one side of the alignment of the drive motor and the drive wheel. In these circumstances, the weight and positioning of the power or fuel source may need to offset the weight and positioning of the motor to avoid too much weight imbalance. Described another way (without regard to the power/fuel source), the drive motor may be located closer to a back end of the apparatus or frame than the drive wheel, and the drive wheel may be located closer to a front end of the apparatus or frame than the drive motor.

For purposes of the present invention, the term "front-to-back center plane" in reference to a wheelbarrow (or wheelbarrow tray) shall mean an imaginary plane that bisects the wheelbarrow tray into two symmetrically equal halves (assuming that the wheelbarrow tray has a bilaterally symmetrical shape). If the wheelbarrow tray has at least four side walls, the term "front-to-back center plane" in reference to a wheelbarrow (or wheelbarrow tray) shall also mean an imaginary plane that includes the respective midlines of the front wall, the bottom wall, and the back wall of the tray (assuming that the wheelbarrow tray has a bilaterally symmetrical shape). A "midline" of a wall of a tray is defined as an imaginary line that bisects the respective wall of the tray into two equal halves. The front-to-back center plane may be further described as a vertical plane that is generally perpendicular to the ground when the wheelbarrow is resting in an upright position. In reference to a wheelbarrow tray, the front-to-back center plane of the tray may also be described as a vertical plane when the bottom wall of the tray is oriented generally in parallel with, and/or placed on, the ground.

For purposes of the present invention, the term "front-to-back axis" of a wheelbarrow or tray shall mean an imaginary line or axis that passes through the front and back walls of the tray or an imaginary line or axis that is at least parallel to another imaginary line or axis that passes through the front and back walls of the tray. A "front-to-back center axis" shall mean a front-to-back axis that is also within the "front-to-back center plane" of a wheelbarrow (or wheelbarrow tray).

In three-dimensions, two or more parallel lines or axes are defined as being parallel to each other within a common plane.

In the example shown in FIG. 2, the frame 221 is shown having a first (or left) main frame member 221a oriented lengthwise (i.e., with its longest dimension and/or its longitudinal axis oriented in a generally front-to-back direction) and a second (or right) main frame member 221b also oriented lengthwise (i.e., with its longest dimension and/or its longitudinal axis oriented in a generally front-to-back direction). The longest dimension and/or the longitudinal axis of each of the first and second main frame members 221a, 221b (or at least corresponding portions of those first and second main frame members 221a, 221b), may be oriented approximately in parallel with each other.

For purposes of the present invention, the terms "approximately in parallel" or "approximately parallel" shall mean that their respective axes and/or longest dimensions are within a range of ±15° of being perfectly in parallel with each other (with "perfectly in parallel" or "perfectly parallel" meaning a relative angle of 0°) and shall include ranges of relative angles that are within ±15°, or alternatively within ±10°, or alternatively within ±5°, of being perfectly in parallel. The terms "approximately in parallel" or "approximately parallel" further include being "nearly in parallel," "nearly parallel," "perfectly in parallel" and "perfectly parallel."

Each of the main frame members may have a variety of different, suitable cross sectional shapes and sizes and/or comprise one or more pieces that may be fixedly joined, attached, assembled, etc., together. When the frame includes two or more main frame members, the main frame members may have the same size and shape and/or a symmetrical size and shape relative to each other. According to many embodiments, each of the main frame members may include a forward portion and a rear portion. The rear portion of a main frame member may be involved in securing the main frame member to a slide (see below) and/or the wheelbarrow tray, and the forward portion of a main frame member may be used to hold the axle of the drive wheel in place. The forward portions of the main frame members may also be reinforced by additional frame pieces, such as a drive wheel support(s), that may also optionally engage the drive wheel axle and/or drive wheel. The forward and rear portions of a main frame member may be one continuous piece or comprise separate pieces that are joined together. Alternatively, a main frame member may include a forward main frame member and a rear main frame member that are separate pieces and that may not be directly connected, attached, etc., to each other. For example, a forward main frame member and a rear main frame member may be joined, linked, connected, etc., via a lateral frame member.

Additional lateral frame members may also be present to provide rigidity and strength and/or hold the first and second main frame members together. Like the main frame member(s), these lateral frame member(s) may have a variety of different, suitable cross sectional shapes and sizes and may generally be made of metal. Each lateral frame member may comprise one piece or two or more pieces fixedly attached, joined, assembled, etc., together. Each of these one or more lateral frame member(s) may bridge between two or more main frame members and/or may be approximately perpendicular to the longest dimension and/or longitudinal axis of the main frame member(s) or at a different, non-perpendicular angle. The lateral frame members may also differ in their lengths, cross-sectional shape(s), and/or orientation in comparison to each other. In addition to linking other frame members together, the lateral frame members may also assist in holding, attaching, securing, etc., a component of the present device or apparatus in place. Alternatively, a lateral frame member may extend from only one of the main frame members (and not reach another main frame member), and/or a lateral frame member may assist in attaching a component of the device or apparatus to the frame.

According to the example embodiment in FIG. 2, a first lateral frame member 221g is shown near the back of the device (and near the back of the power or fuel source 230), and a second lateral frame member 221h is shown near the middle of the device (and near the front of the power or fuel source 230). These first and second lateral frame members 221g, 221h are also shown assisting with holding the power or fuel source 230 in place by their placement between the power or fuel source 230 and the wheelbarrow. An additional lateral frame member 221i is further shown that assists in mounting and securing the motor 225 in place.

The frame may further comprise additional frame members, pieces, accessories, etc., that are specially adapted for attaching, mounting, etc., specific components, such as the motor, power source, etc., to the rest of the frame and device or apparatus of the present invention or to other components. For example, specially designed pieces may be used to hold the motor in place depending on the shape of the motor. As another example, one or more holding structures may be used to attach, secure, hold, etc., a power or fuel source to the frame and the rest of the device or apparatus of the present invention. These holding structures may have a variety of cross sections. For example, as shown in FIG. 2, a first holding structure 220a and a second holding structure 220b is shown oriented approximately in parallel with each other (and in parallel with a front-to-back axis of the wheelbarrow or tray). The holding structures are shown wrapping around the power or fuel source 230 to hold the power or fuel source 230 in place. Each of the first holding structure 220a and the second holding structure 220b may be attached at one end to the first lateral frame member 221g and at the other end to the second lateral frame member 221h. Alternatively, each of the holding structures may be oriented approximately perpendicular (or possibly any other angle) relative to the front-to-back axis of a wheelbarrow or tray and attached at each of their ends to the respective main frame member(s) and/or lateral frame member(s) as the case may be.

Although the first and second main frame members may be described as having a longest dimension and/or a longitudinal axis, these main frame members may not be linear in shape and may instead be curved and may have different portions oriented and/or angled differently. Furthermore, the frame of the present device or apparatus may comprise more than two main frame members, and the frame may further include one or more lateral frame members that may bridge between, and/or connect, attach, secure, etc., together, two or more of the main frame members. As stated above, each main or lateral frame member may include, and be constructed of, more than one piece that may be fixedly attached, connected, etc., together by any suitable means, such as by fastening, welding, soldering, brazing, etc. Regardless of its exact construction, arrangement, etc., the frame of the present device or apparatus when assembled, attached, etc., may preferably have a symmetrical structure (as much as possible) to maintain weight balance when attached, etc., to a wheelbarrow (although some amount of counter weight may be tolerated and may actually be used to offset any weight imbalance that may otherwise be caused by other components of the present device or apparatus).

As shown in FIG. 2, the main frame members 221a, 221b are each shown having a symmetrically curved shape and structure. Each of the first and second main frame members 221a, 221b is shown having back or rear portions 221c, 221e, respectively, that are generally oriented in a plane parallel with the bottom side 101e of the tray 101 of the wheelbarrow 100. Each of the first and second main frame members 221a, 221b is further shown having forward portions 221d, 221f, respectively, that are angled away from the bottom wall 101e of the tray 101 (relative to the respective back attachment portions 221c, 221e) that may be used for holding the drive wheel 245 in place, such that the drive wheel is kept within the front-to-back center plane of the wheelbarrow (and wheelbarrow tray) and aligned with the centered front wheel 105 when attached to the wheelbarrow 100. These forward portions 221d, 221f that are angled away from the bottom wall 101e of the tray may also be referred to as angled front portions.

To have the wheel-on-wheel engagement between the drive wheel and the front wheel of the wheelbarrow, their respective mid-planes may be generally or approximately aligned such that an outer portion of the drive wheel can engage an outer portion of the front wheel of the wheelbarrow. According to some embodiments, in addition to being approximately aligned with each other, either or both of the respective mid-planes of the drive wheel 245 and the centered front wheel 105 may be approximately aligned within the front-to-back center plane of the wheelbarrow (and/or wheelbarrow tray). For purposes of the present invention, the "mid-plane" of a wheel shall refer to an imaginary plane that is perpendicular to the rotational axis of the wheel and that bisects the wheel itself into two symmetrically equal halves. The forward or distal ends of the forward portions 221d, 221f of the main frame members 221a, 221b may be forked to receive and hold the axle 246 of the drive wheel 245, which may be secured to the forward portions 221d, 221f by additional wheel-mounting fasteners or accessories 222a, 222b, respectively.

According to some embodiments, the device or apparatus of the present invention may be attached, mounted, etc., to the underside of the bottom wall of a wheelbarrow tray directly, such that the device or apparatus of the present invention has a generally fixed position. For example, one or more of the main frame member(s) and/or lateral frame member(s) of a frame may be fastened, welded, etc., to the underside of the bottom wall of the wheelbarrow tray. More preferably, however, the device or apparatus of the present invention may instead be attached, mounted, etc., indirectly to the underside of a wheelbarrow tray via a sliding mechanism, such that the position of the present device or apparatus may be adjusted and moved along a front-to-back axis, which may be approximately in parallel with the bottom wall of the wheelbarrow tray or at a small angle relative thereto. By adjusting the position of the device or apparatus of the present invention, the drive wheel of the present device or apparatus may be moved into, and out of, contact and engagement with the centered front wheel.

The slide mechanism of the present invention may also permit the device or apparatus (except for stationary members of portions of the slide mechanism) to be easily slid out and removed entirely from the wheelbarrow tray. Each sliding mechanism or slide may include one or more sliding member(s) and one or more stationary member(s) that move or slide relative to each other with the stationary member(s) fixedly attached, connected, joined, etc., directly or indirectly to the wheelbarrow tray. The stationary member and the sliding member of a slide may each comprise one or more pieces that are attached, assembled, etc., together. With the sliding engagement, the present device attached, etc., to the sliding member(s) of the slide(s) may be removed from the wheelbarrow (or wheelbarrow tray) by sliding the present device off the back end of the stationary member(s) of the slide(s). The ability to fully remove the present device from the wheelbarrow may allow the wheelbarrow to be used temporarily or indefinitely without most or all of the present device or apparatus attached to the wheelbarrow and/or for components or parts of the device to be serviced, replaced, etc. The device or apparatus of the present invention may then be reattached by bringing the sliding members of the slide(s) back into sliding engagement with the stationary member(s) of the slide(s), such as by inserting the sliding member(s) into the one end of the stationary member(s) of the slide(s).

To allow for the present device or apparatus to be fully removed from the wheelbarrow or tray, however, one or more slide limit(s) for each of the slide(s) that may normally restrict the range or distance of sliding movement by the sliding member(s) of one or more of the slide(s) (such as for safety purposes) may need to be disengaged, unlocked, moved out of the way, etc. According to some embodiments, an adjusting plate of a slide adjuster (see below) may effectively function as a slide limit for the slide(s) by obstructing or interfering with the range of sliding motion allowed by the cylinder (or responsive member) of the slide adjuster since the back end of the cylinder (or responsive member) would eventually contact the forward or front face or end of the adjusting plate if the cylinder (or responsive member) is moved backward. Thus, by detaching, removing, etc., the adjusting plate from the underside of the wheelbarrow tray, this obstruction may be removed, and the present device may be slidably removed and detached from the wheelbarrow or tray. Alternatively, the manner of attachment, etc., of the present device to the underside of the wheelbarrow tray, such as the manner of attachment of the frame and/or the stationary members of the slides to the tray, may be reversible such that most or all of the present device or apparatus may instead be removed from the wheelbarrow or tray by reversing this manner of attachment (i.e., not by sliding the device off the back end of the stationary members of the slides).

The sliding mechanism of the present invention may generally include one or more slides that connect the rest of the device or apparatus of the present invention to the underside of a wheelbarrow tray. Such slide(s) will preferably be sufficiently heavy duty to withstand the forces and jarring involved with use of a wheelbarrow as well as the amount of sustained pressure or force that may need to be applied by the drive wheel against the front wheel of the wheelbarrow when engaged. Preferably, two slides are used that are oriented with their respective longest dimension and their longitudinal and sliding axes oriented nearly or perfectly in parallel with each other to allow for their freedom of movement together. The terms "nearly in parallel" or "nearly parallel" shall mean within a range that is ±5° or less of being perfectly in parallel, or more preferably within a range that is ±3° or less of being perfectly in parallel. By using two or more slides (rather than one), a more secure sliding mount, attachment, etc., may be made with the wheelbarrow tray. By having two slides (rather than one), a space may be provided between the two slides that may be occupied by a position or slide adjuster (see below) for a user to move or slide the present device or apparatus into, and out of, contact and engagement with the centered front wheel of the wheelbarrow.

Each of the slides may have one of a variety of different constructions and mechanisms, which may include or resemble the various types of slides known in the art. For example, a slide of the present invention may be similar to the types of slides used with furniture or industrial sliding drawers, trays, camper beds, etc., or to the types of mechanical sliding mechanisms used with sliding car seats. As mentioned above, each of these slide(s) of the present invention will generally comprise one or more stationary member(s) and one or more sliding member(s) with the stationary member(s) and the sliding member(s) slidably engaged with each other. The term "stationary" in this sense is relative to the wheelbarrow or tray. The one or more stationary member(s) will generally be fixedly attached (directly or indirectly) to the underside of the bottom wall of the wheelbarrow tray, whereas the one or more sliding member(s) will generally be fixedly attached (directly or indirectly) to the frame or some other part of the present device or apparatus. The manner of sliding engagement between the one or more stationary member(s) and the one or more sliding member(s) of a slide will depend on the type of slide used, but the sliding engagement will generally restrict the relative movement of the stationary member(s) and the sliding member(s) to a single sliding axis when the stationary member(s) and the sliding member(s) are engaged.

Various types of sliding engagements from a simple tongue-and-groove to a roller or bearing engagement are possible for each slide. Although combinations of different slides and/or slide types could be used as part of the present invention, the same type of slide may generally be used when two or more slides are used together. With the so-called tongue and groove engagement, either the stationary member or the sliding member of a slide may include an elongated runner or track having a lengthwise slot or groove therein. The track may be an elongated structure confining the interior slot or groove, which is mostly or fully enclosed on at least two or three sides when the track is viewed in cross-section with possibly additional flanges or other structures that may also partly enclose the interior slot or groove. According to these embodiments, the lengthwise slot or groove of the track of the stationary or sliding member of the slide would have a cross-sectional shape that is generally wider at or within an interior portion and narrower at an outer neck portion. The other corresponding member(s) would have a tongue or insertion with a cross-sectional shape that may closely match, or at least fit within, the cross-sectional shape of the lengthwise slot or groove of the elongated runner or track, such that the tongue or insertion is held within the slot or groove of the elongated runner or track. As a result of the lengthwise slot or groove having a narrower outer neck portion, the relative movement between the stationary member and the sliding member with this type of engagement is restricted to the lengthwise direction of the slot or groove (i.e., the sliding axis of the slide). In other words, their relative movement is restrained or limited to only forward and back directions that are in alignment with the lengthwise slot or groove.

The stationary or sliding member of the slide comprising the one or more tongue(s) or insertion(s) may also comprise a base portion from which the tongue(s) or insertion(s) extend or project. The base portion may be used in part to attach, etc., the respective member directly or indirectly to the present device or frame (if a sliding member) or to the wheelbarrow tray (if a stationary member). Additional, structure, walls, plates, flanges, etc., may also extend or be connected to the base portion of the member, which may also confine and/or at least partially enclose or wrap around the other corresponding member of the slide, such as like an outer track.

The sizes, dimensions and cross-sectional shapes of both the groove/slot of one member and the tongue(s) or insertion (s) of the other member may each vary considerably. Indeed, the tongue(s) or insertion(s) may not be solid but may instead have various gaps or openings in its structure and shape. The lengthwise dimensions of each tongue/insertion may also vary. Likewise, the track and slot or groove of the other member may have a variety of different cross sectional shapes and sizes. However, the slot/groove of either the stationary or the sliding member may instead have a constant cross-sectional size and shape, and/or the tongue(s) or insertion(s) of the other corresponding member would have a cross-sectional size and shape that nearly matches or closely corresponds to the size and shape of the slot or groove.

Figure 6A:
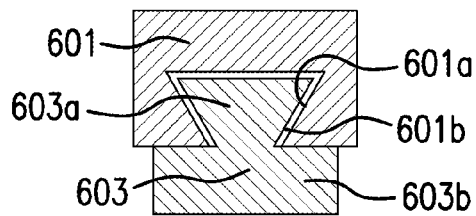
FIG. 6A-E show cross-sectional views of various types and embodiments of a slide comprising a sliding member and a stationary member.
Figure 6B:
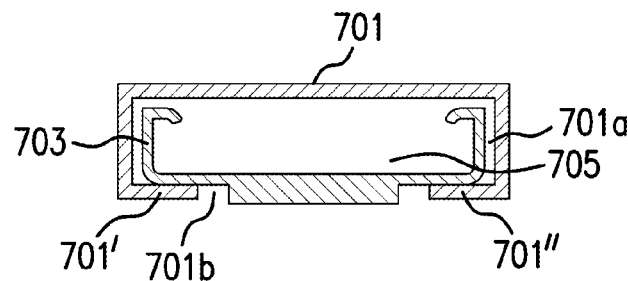

A couple examples of possible cross-sectional shapes of the stationary and sliding members of a "tongue-and-groove" type of sliding engagement or slide are provided in FIGS. 6A and 6B. In FIG. 6A, a stationary member 601 is shown having a slot or groove therein having a wider inner portion 601a and a narrower outer neck portion 601b. Because the tongue or insertion 603a of the corresponding sliding member 603 has a similar cross sectional shape, the movement of the sliding member is restrained to the lengthwise axis of the slot/groove. The base portion 603b of the sliding member 603 is also shown. This simplified example could also be reversed such that the stationary member has the tongue or insertion and the sliding member has the elongated slot or groove.

According to another example provided in FIG. 6B, a stationary member 701 is shown as a track having an interior hollow space 705 that is partially enclosed or surrounded by two outer flanges 701', 701" of the stationary member 701. Thus, a wider inner portion 701a and a narrower neck portion 701b are formed, and thus relative movement of the sliding member 703 is restrained to the lengthwise axis of the interior space 705 and inner portion 701a of the stationary member 701. In the example of FIG. 6B, the slot or groove of the stationary member 701 is the wider inner space 701a of the stationary member 701. Indeed, the sliding member 603 may itself be described as an inner track that fits inside the outer track or slot of the stationary member 701. Again, the example in FIG. 6B could also be reversed such that the stationary member has the tongue or insertion and the sliding member has the elongated slot or groove. The arrangement of the slide shown in FIG. 6B (or in its reverse orientation) may be described as comprising an inner track and an outer track with the inner track of the sliding or stationary member positioned inside the outer track of the other member.

With both example embodiments in FIGS. 6A and 6B, each of the stationary members 601, 701 may be attached, mounted, etc., directly or indirectly on its top surface as shown to the wheelbarrow tray, and each of the sliding members 603, 703 may be attached, mounted, etc., directly or indirectly on its bottom surface to the frame or other portion of the present device. Alternatively, either of the slides in FIGS. FIGS. 6A and 6B could have a reduced orientation with members 601, 701 being sliding members attached, mounted, etc., directly or indirectly to the frame or other portion of the present device, and members 603, 703 being stationary members attached, mounted, etc., directly or indirectly to the wheelbarrow tray. The two very distinguishable slide examples in FIGS. 6A, 6B are presented to emphasize how much the cross-sectional sizes, shapes, etc., of the slot and tongue/insertion can vary with this type of sliding engagement according to various embodiments. One skilled in the art would recognize and understand based on this description that many other examples for this type of engagement with numerous different cross-sectional shapes, additional structures, etc., would also be possible.

This type of so-called "tongue-and-groove" engagement is distinguished from the roller and bearing engagements described below by its frictional engagement of the two slide members in the absence of any rollers or bearings between the two members. With this type of engagement, a plurality of tongues or insertions or a single elongated tongue/insertion may be used as either the sliding member or stationary member. Whether the stationary member or the sliding member comprises the tongue(s)/insertion(s) or the corresponding track with the groove(s)/slot(s) therein will depend on which of them is fixedly attached to the wheelbarrow tray or to the present device or frame. The member fixedly attached (directly or indirectly) to the wheelbarrow tray will be the stationary member of the slide.

With this tongue-and-groove sliding engagement, the engaging members of the slide would most likely be mounted between a tray-facing side of the frame and the underside of the wheelbarrow tray bottom wall, such that the present device or apparatus would hang from it beneath the tray when the tray and/or wheelbarrow is in an upright position. The stationary and sliding members of this type of slide mechanism would most preferably be made or constructed of metal or metal alloy, such as steel, aluminum, etc., but could also be made or constructed of wood, wood-like material, plastic, etc., having sufficient durability, or any suitable combination thereof. Each of the stationary or sliding members comprising either the insertion(s) and/or the corresponding track(s) with the slot(s) therein may also each be made of one or more pieces assembled, etc., together. A lubricant may also be used between the two members to decrease friction and facilitate sliding movement with this type of engagement. With this type of engagement, the corresponding members of the slide may become fully disengaged or detached from one another by sliding one of the two members out of engagement with the other member, which may further require disengaging, etc., a slide limit(s) that restricts the range of relative sliding movement by the sliding member of the slide. Although the tongue-and-groove engagement may be used with the present invention, it may be less preferred due to its potential lack of strength relative to other sliding mechanisms and perhaps its tendency to bind or stick due to friction between the two members of the slide.

Another type of slide of the present invention may use a rolling engagement. With this type of engagement, either the stationary member or the sliding member may include one or more rollers (or wheels) that engage an interior surface of a track of the other corresponding member of the slide. A track with this type of roller engagement may be defined similarly as described above with regard to the tongue-and-groove engagement. Such a track may include at least a main plate or wall and a bottom wall and/or a top wall, which may extend from the bottom and top of the main plate, respectively. These top and/or bottom walls (along with the main plate or wall) may at least partially enclose an elongated interior space that functions to guide and restrict the movement of the one or more roller(s) of the other member to only the longitudinal or lengthwise axis of the track and its elongated interior space (i.e., a sliding axis) when the two members are engaged due to the one or more roller(s) being contained within the track by portions of the track wrapping at least partially, mostly or fully around at least two or three sides of the roller(s). Additional flange(s), structures, etc., may also be present that may extend from the top and/or bottom walls of the track to further enclose the elongated interior space of the track. These flanges may be located, for example, on the side of the interior space of the track that is opposite the main wall or plate.

With this type of rolling engagement, an inner surface of at least one wall, plate, etc., of the track of one member of the slide, such as an inner surface of a top or bottom wall or plate, may rest on, be situated under, and/or roll over or under, the one or more of the rollers of the other corresponding member of the slide, such as due to gravity. Thus, the two members are able to slide relative to one another due to their rolling engagement with the roller(s) of one member being able to rotate and maintain contact with the surface of the respective wall, plate, etc., of the other corresponding member. According to many of these embodiments, each roller of one member of the slide may contact and engage an inner surface of a top wall or plate of the corresponding member of the slide if the one or more roller(s) are part of the stationary member fixedly attached, etc., to the wheelbarrow tray, but the one or more roller(s) of one member of the slide may instead contact and engage an inner surface of a bottom wall or plate of the corresponding member if the one or more roller(s) are part of the sliding member fixedly attached, etc., to the present device and/or its frame. However, in each of these instances, one or more of the roller(s) of one member of a slide may not contact the other corresponding member under some circumstances of their engagement, which may be due to the presence of other structures of the slide that may separate the roller from contacting the corresponding member.

Each of the one or more roller(s) of one or both members of the slide may be directly or indirectly attached, etc., to the present device or frame (if part of a sliding member) or to the wheelbarrow tray (if part of a stationary member), by a roller mount, which may itself have a variety of different configurations and shapes. The roller mount may be as simple as a vertical plate that attaches to the wheelbarrow tray by an attaching portion of the roller mount (if part of the stationary member), or the roller mount may include one or more plates or walls mounted to the side of the frame (if part of the sliding member). According to some embodiments, each roller mount may only be present where a respective roller is to be positioned. Alternatively, the roller mount may be an elongated structure corresponding in length to some, most or all of the length of the track of the corresponding member of the slide, and such a roller mount may be used to support and hold one or more roller(s) in position. Indeed, a roller mount of a stationary or sliding member may itself comprise a track, which may also partially or mostly wrap around at least two or three sides of the track of the corresponding member to keep the two members engaged and restrain their relative movement along their relative sliding axis.

According to some embodiments, the two members of a slide with a rolling engagement may each comprise a track, and each track of the two corresponding members may include either an inner track or an outer track with the inner track of one member confined to the interior of the outer track of the other member. With this arrangement, the two tracks when engaged may be restricted in their relative movement to only sliding along the lengthwise or longitudinal axis of the outer track and its elongated interior space. As an alternative, portions of each of the two respective tracks of the two corresponding members may be partly inside and partly outside the track of the other corresponding member. For example, a top or bottom wall of a track of one member of the slide may be positioned on the outside of the corresponding member, but the other top or bottom wall of the track may be positioned on the inside of the corresponding member. In any case, the one or more roller(s) of one member of the slide will generally directly contact and engage an interior surface of a track of the other corresponding member, such as the inner surface of a top wall of the corresponding member, which may require (if applicable) that such a top wall or interior surface of the corresponding member be positioned inside the roller mount of the other member of the slide.

Depending on the arrangement, this type of engagement with the present invention could conceivably be mounted between a tray-facing side of the frame and the wheelbarrow tray, or perhaps more preferably, with one of the members mounted to a side(s) of the frame and the other corresponding member mounted to the underside of the wheelbarrow tray. The track(s) of the stationary and/or sliding member(s) with this type of engagement may each comprise one or more pieces that are attached, assembled, etc., together and each track may preferably be made of metal or metal alloy, such as steel, aluminum, etc., but could also be made of a sufficiently durable plastic, wood, wood-like material, etc., or any suitable combinations thereof. The roller(s) may preferably be made of plastic, but may also be made of metal, metal alloy, wood, wood-like material, etc., or any suitable combinations thereof.

As indicated above, the rolling engagement of a slide of the present invention may have a variety of different constructions and arrangements. One or both of the stationary member(s) and/or the sliding member(s) may have one or more rollers. In addition, either or both of the stationary member and/or the sliding member may comprise a track as defined above with an elongated interior space for receiving the rollers therein (even if that member also has one or more rollers). Such a member may also include a track mount(s) in addition to the track itself as well as other possible components, structures, parts, pieces, etc. For example, the stationary member or the sliding member may include an outer track, and the other corresponding member may include an inner track, such that the inner track fits inside the outer track with one of the two members being able to slide forward or backward in their lengthwise or longitudinal axis or direction relative to the other member. In addition, one or both of the two corresponding members may also include at least one roller that engages either the inner track or the outer track of the other corresponding member. Such a member may also include a roller mount(s) in addition to the roller(s) themselves as well as other possible components, parts, structures, pieces, etc. If either the stationary member or the sliding member does not include a track but does include one or more rollers, those roller(s) may either be mounted to the side of the frame (if part of a sliding member) directly or indirectly via one or more roller mount(s), or held in place by a roller mount(s) attached to the underside of the wheelbarrow tray (if part of a stationary member).

A roller mount of a stationary member of a slide may include a base portion that may be mounted, attached, etc., to the underside of the wheelbarrow bottom wall and an extended vertical portion that extends downward from the bottom wall of the tray that holds the roller in place. The axis of rotation of the roller may thus be perpendicular to a major plane of a vertical portion of the roller mount. If a stationary member includes a track, that track may be held in place by a track mount attached, mounted, etc., to the underside of the wheelbarrow tray, or the track may instead be mounted directly to the wheelbarrow tray. On the other hand, a roller of a sliding member may be mounted, attached, etc., to the frame directly or mounted, attached, etc., to the frame by a roller mount. A track of one member of a slide may have a dual purpose that functions as both a track and a roller mount. Alternatively, one or both members of a slide may instead comprise a roller mount and/or a separate track and/or track mount.

Figure 6C:
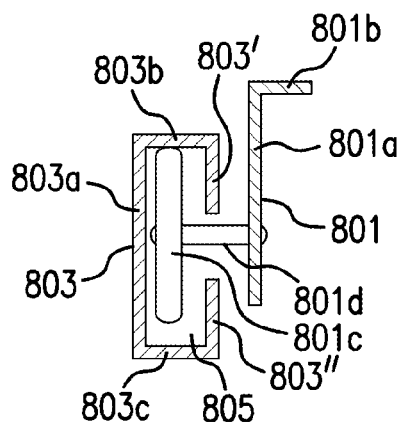

FIG. 6C presents a cross-sectional view of an example embodiment of a slide having a rolling engagement that may be used with a device or apparatus of the present invention. According to this example, a stationary member 801 of a slide is shown with a main vertical plate 801a and a base portion 801b with the vertical plate 801a holding a roller 801c in place via a roller axle 801d. The roller 801c of the stationary member 801 is also shown in engagement with the sliding member 803 of the slide. Depending on its three-dimensional arrangement, the main vertical plate 801*a* and base portion 801*b* of the stationary mount 801 may together be referred to as a "roller mount" for roller 801*c*. A sliding member 803 is further shown as a track with a main plate 803*a* and a top wall 801*b* and a bottom wall 801*c*. With this example engagement, the roller 801*c* is shown contacting and rolling against or under the engaged inner surface of the top wall 803*b* of the sliding member 803. Additional flanges 803', 803" are also shown extending down or up from the top wall 803*b* and bottom wall 803*c*, respectively, of the sliding member 803 to enclose an elongated interior space 805 of the sliding member 803, which confines the roller 801*c* of the stationary member 801 to within the elongated space 805 of the stationary member 803. Thus, the roller 801*c* may only move forward or backward (i.e., into or out of the page) along the longitudinal or lengthwise axis of the elongated space 805 of the stationary member 803.

According to the example of a sliding engagement presented in FIG. 6C, the base portion 801*b* of the stationary member 801 may be attached, etc., directly or indirectly to the wheelbarrow tray, and a portion of the sliding member 803, such as the main vertical plate 801*a*, may be attached, etc., directly or indirectly to the present device and/or its frame. Again, this orientation of the slide in FIG. 6C could be reversed with the stationary member of the slide comprising a track (that may be similar to member 803), which may be attached, etc., to the wheelbarrow tray directly, such as by its top wall, or indirectly via a track mount attached to the track. In the reversed orientation, the sliding member of the slide may comprise a roller and roller mount (that may be similar to member 801), which may be attached, etc., to the present device and/or its frame directly or indirectly. With this reversed orientation, the roller may instead contact and engage as well as roll over, ride on, etc., an inner surface of a bottom wall or portion of the track of the stationary member. Due to gravity causing the present device to hang from the bottom of the wheelbarrow, a slide having a rolling engagement may have the roller(s) of one member of the slide rolling against a top or bottom surface of a corresponding track depending on whether the roller(s) are part of the stationary or sliding member.

It is important to emphasize, however, that the embodiment in FIG. 6C is only one example of a rolling engagement for a slide. One skilled in the art would recognize and understand based on this description that many other examples for this type of engagement for a slide with members having a variety of different cross-sectional shapes, etc., perhaps in combination with additional components, structures, pieces, etc., would also be possible.

Another type of engagement for a slide of the present invention may utilize a plurality of ball bearings between the two members of a slide. Such a bearing engagement for the slide(s) may be the most preferable type of engagement between the two members of a slide according to the present invention due to their potentially heavy-duty construction and their generally smooth gliding or slide action between the two members of a slide of this type. Generally speaking, to bearing engagement may comprise an elongated sliding member and an elongated stationary member with a plurality of bearings disposed between them such that relative movement between them is restricted or limited to a sliding movement along their longitudinal or lengthwise axes when the two members are engaged. Thus, generally free sliding movement of the sliding member relative to the other stationary member is provided with the bearing engagement due to the rotation of the bearings between the corresponding surfaces of the two engaged members of the slide with relatively little friction or force being applied. Additional lubrication may also be present between the two members to further reduce friction between them. With these embodiments having a bearing slide mechanism, the track(s) and bearings would preferably be made or constructed of metal or metal alloy, although they may also conceivably be made or constructed of a sufficiently durable plastic, wood, wood-like material, etc., or any suitable combination thereof. Such bearing-engagement slides may be mounted between the tray-facing side of the frame and the wheelbarrow tray, such that the present device or apparatus would hang from the slides when the wheelbarrow is in an upright position. Each of the members of the slide may comprise a track and/or one or more tongue(s) or insertion(s) as described above and possibly one or more additional pieces, structures, components, etc., assembled together.

According to many example embodiments of the present invention having slide(s) with a bearing engagement between its two members, the bearing engagement may resemble or be similar to the so-called "tongue-and-groove" engagement described above except for the addition of the bearings between its two members. However, unlike many examples with the "tongue-and-groove" engagement (see, e.g., FIG. 6A), there must be sufficient space(s) or gap(s) between wider interior portion(s) of the slot or track of one of the members and the tongue(s) or insertions(s) of the other corresponding member to accommodate the inclusion of the bearings in the slide. According to these embodiments, the stationary or sliding member with the one or more tongue(s) or insertions(s) may or may not further include a track.

According to some of these embodiments, either the stationary member or the sliding member of a slide may include an inner track, and the other corresponding member of the slide may include an outer track. As such, the inner track of one member may be placed within the outer track of the other member, and a plurality of ball bearings may be disposed between the inner and outer tracks of the two members with the bearings positioned on one or more sides of the inner track. According to these embodiments, the bearings may be disposed between those inner and outer tracks of the two members. According to some embodiments, the inner and outer tracks may further include flanges that at least partially confine, surround, enclose, etc., lateral spaces between the inner and outer tracks (e.g., one on each side of the inner track) that may be used to contain the bearings and/or optimize the bearing contact with the two members.

Figure 6D:
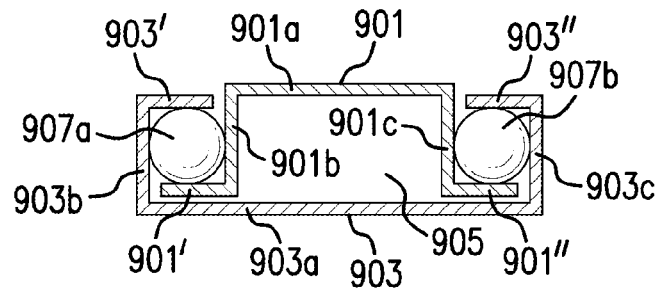

FIG. 6D provides a cross-sectional view of a simple example embodiment of the present invention having a bearing type of engagement. A stationary member 901 of the slide is shown, which may be described as an inner track, with a main wall 901*a*, a first side wall 901*b*, and a second side wall 901*c* along with a pair of flanges 901', 901" extending from the first side wall 901*b* and the second side wall 901*c*, respectively. A sliding member 903 of the slide is also shown in FIG. 6D having a main wall 903*a*, a first side wall 903*b*, and a second side wall 903*c* with a pair of flanges 903', 903" extending from the first side wall 903*b* and the second side wall 903*c*, respectively. In cross section, FIG. 6D further shows a pair of bearings 907*a*, 907*b* between the stationary member 901 and the sliding member 903 of the slide. A first bearing 907*a* is shown between two of the flanges 901', 903' and the first side walls 901*b*, 903*b* of the stationary and sliding members, respectively. A second bearing 907*b* is also shown between two of the flanges 901", 903" and the second side walls 901*b*, 903*b* of the stationary and sliding members, respectively.

According to the example of a bearing engagement presented in FIG. 6D, a portion of the stationary member 901, such as the main plate 901a, may be attached, etc., directly or indirectly to the wheelbarrow tray, and a portion of the sliding member 903, such as the main plate 903b, may be attached, etc., directly or indirectly to the present device and/or its frame. Again, as noted similarly above for the examples of other engagement types, the orientation of the slide shown in FIG. 6D could be reversed with member 903 being the stationary member of the slide, which may be fixedly attached, etc., directly or indirectly to the wheelbarrow tray and with member 901 being the sliding member of the slide, which may be fixedly attached, etc., directly or indirectly to the present device and/or its frame. It is important to emphasize again, however, that the embodiment in FIG. 6D is only one example of a bearing engagement for a slide. One skilled in the art would recognize and understand based on this description that many other examples for this type of engagement for a slide with members having a variety of different cross-sectional shapes, etc., perhaps in combination with additional components, structures, pieces, etc., would also be possible.

Returning to the example embodiment in FIG. 2, a pair of slides including a first (or left) slide 223 and a second (or right) slide 224 is shown. The sliding member of the first slide 223 may be attached (directly or indirectly) to the first main frame member 221a by a first slide fastener 223c and a second slide fastener 223d. An indirect attachment may include one or more additional intervening pieces or spacers between the sliding member and the main frame member. However, the sliding member of the first slide 223 may alternatively be welded or otherwise appropriately attached (directly or indirectly) without a fastener to the first main frame member 221a to provide sufficient durability and safety for a user. Likewise, the sliding member of the second slide 224 may be attached (directly or indirectly) to the second main frame member 221b by a first slide fastener and a second slide fastener (not visible). However, the sliding member of the second slide 224 may alternatively be welded, etc., (directly or indirectly) without a fastener to the second main frame member 221b.

The stationary member of the first slide 223 may be attached (directly or indirectly) to the bottom wall 101e of the tray 101 by a third slide fastener and a fourth slide fastener (not visible). An indirect attachment may include one or more additional intervening pieces or spacers between the stationary member and the tray. However, the stationary member of the first slide 223 may alternatively be welded or otherwise appropriately attached (directly or indirectly) without a fastener to the bottom wall 101e of the tray 101 to provide sufficient durability and safety for a user. Likewise, the stationary member of the second slide 224 may be attached (directly or indirectly) to the bottom wall 101e of the tray 101 by a third slide fastener and a fourth slide fastener (not visible). However, the stationary member of the second slide 224 may alternatively be welded, etc., (directly or indirectly) without a fastener to the bottom wall 101e of the tray 101. According to these embodiments, the direct or indirect attachment of the sliding member of the second slide 224 to the second main frame member 221b and the direct or indirect attachment of the stationary member of the second slide 224 to the tray 101 may be similar and analogous to the attachment of the first slide 223.

According to yet other embodiments of the present invention, a slide may instead include a guide rail or bar and another structure with a hole for inserting the guide rail or bar through it. Alternatively, a clamp or the like may be used that at least mostly wraps around guide rail or bar. According to these embodiments, the stationary member or the sliding member of the slide may comprise the guide rail, bar, etc., and the other corresponding member may comprise a structure with a hole, clamp, etc., to receive and hold the guide rail, bar, etc., of the other member of the slide. Thus, the guide rail(s) or bar(s) may be fixedly attached, etc., directly or indirectly to present device or its frame, or it may be part of the frame itself, and a structure with the hole through it or a clamp, etc., may be attached, etc., directly or indirectly to the wheelbarrow tray. The reverse orientation and arrangement may also be used with a guide rail, bar, etc., attached etc., directly or indirectly to the wheelbarrow tray, and a structure with a receiving hole, a clamp, etc., attached, etc., directly or indirectly to the present device or its frame. In either arrangement, the sliding member is able to move or slide relative to the stationary member due to the ability of the rail, bar, etc., being able to slide through the structure, clamp, etc., of the corresponding member.

This type of guide rail engagement may be similar in many ways to the "tongue-and-groove" engagement described above, but unlike the slot of a track with that arrangement as discussed above, the structure used as one of the members of the slide may completely surround the guide rail or bar of the other member inserted through a bore hole in the structure. In addition, unlike the "tongue-and-groove" engagement (and regardless of whether a structure with a hole or a clamp is used as one of the members), the side(s) of the guide rail or bar of the other member of the slide may not be attached to the present device or the wheelbarrow frame. Instead, for example, the two ends of each guide rail or bar may be turned such that those ends may be attached, connected, etc., directly or indirectly to the present device or its frame (if part of the sliding member) or to the wheelbarrow tray (if part of the stationary member) with most or all of the remainder of the guide rail or bar between the two ends separated at a distance from the present device and frame or from the wheelbarrow tray (as the case may be). This separation may be a distance that is at least sufficient to allow the corresponding structure or clamp to slidably engage the guide rail or bar without interference.

Figure 6E:
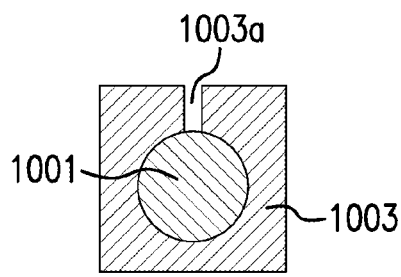

The guide rail, bar, etc., as well as the hole or slot of the corresponding structure, clamp, etc., may each have a variety of different cross-sectional sizes and shapes, but those sizes and shapes may be about the same or closely matched for corresponding members of a slide to produce a tight enough fit that avoids wobbling and instability and maintains proper contact and friction between the drive wheel and front wheel of the wheelbarrow. FIG. 6E provides a cross-sectional view of an exemplary embodiment of the present invention with this type of sliding engagement. A sliding member comprising a structure or clamp 1003 having a hole or slot that receives the bar or rail 1001 of the stationary member is shown. In this example, a small gap 1003a is present in the sliding member of the slide such that the corresponding rail or bar is not fully surrounded. According to some embodiments, such a small gap 1003a of a sliding member may be optionally held together by an additional fastener. The bar or rail 1001 of the stationary member may have ends that are turned or bent toward the wheelbarrow tray (not shown) for direct or indirect attachment to the wheelbarrow tray, and the bottom surface of the structure/clamp 1003 as shown may be attached directly or indirectly to the frame of the present device. Again, this arrangement may be reversed with the bar or rail 1001 instead being part of the sliding member and directly or indirectly attached, etc., to the present device or frame and with the structure or clamp 1003 having the hole or slot therein being part of the stationary member and directly or indirectly attached, etc., to the wheelbarrow tray.

Embodiments of the present invention may further include a slide adjuster for determining or controlling the position of the present device or apparatus along a front-to-back axis and to control the engagement (contact) and disengagement (non-contact) between the drive wheel and the centered front wheel. By operation of the slide adjuster, the pressure and contact between the drive wheel and centered front wheel may be increased or decreased, and the drive wheel may also be moved into, and out of, contact and engagement with the centered front wheel. As discussed further below, the slide adjuster may generally include an actuated member and a responsive member. The actuated member may be operated by hand or motor to cause its forward movement (and thus move the drive wheel toward engagement with the front wheel) or its reverse movement (and thus move the drive wheel away from engagement with the front wheel). According to some embodiments, a user may control the relative movement of the actuating member by operation of a control or switch that controls a motor. Thus, a user may simply push a button to actuate the movement of the slide adjuster into a state of engagement or disengagement with the front wheel, which may work in tandem with a pressure sensor, such as on the responsive member, which may electronically, wirelessly, etc., communicate with the control, switch or other device, to determine the amount or degree of movement by a slide adjuster motor to cause sufficient pressure and normal force between the two contacting wheels. In addition to adjusting the position of the present device and its drive wheel along the sliding axis by operation of the actuating member, a user will also be able to lock the actuating member of the slide adjuster in place by some mechanism to hold the present device and its drive wheel at a desired position along the sliding axis, which may be with the drive wheel in or out of contact and engagement with the centered front wheel of the wheelbarrow and/or with a desired level of pressure or normal force between the drive wheel and the centered front wheel.

To transfer the movement of the actuated member to the responsive member (and thus cause movement of the present device or apparatus along with its drive wheel), these two members of the slide adjuster will generally be physically linked in some way, and the responsive member will be attached in some way to the frame of the present device or apparatus. The responsive member of the slide adjuster may be attached, etc., to the frame by any suitable method, such as by fastening, welding, etc. Additional pieces may also be used to help secure, couple, connect, attach, etc., the responsive member of the slide adjuster to the frame. In addition, although the actuating member may be moved forward and backward in parallel with the sliding axes of the one or more slides by hand, the actuating member may instead be moved forward and backward by operation of a motor or other machine.

According to a simple example, a slide adjuster of the present invention may include an elongated actuating member, such as a rod, extended handle or like design, that may have some kind of handle, knob, etc., at its proximal end for effective and ergonomic grabbing, holding, handling, etc., by the hands of a user. Any suitable handle, knob, etc., at or near the proximal end of the actuating member for moving, rotating, operating, etc., the actuating member by a user may be referred to jointly as a handle. The elongated actuating member of a slide adjuster may also extend sufficiently rearward, such that its proximal or back end may be easily accessed by a user.

The elongated actuating member or rod may also be attached at or near its distal end to the responsive member, which may simply be a bracket or structure that may also be attached, etc., to the frame or other portion of the present device. The actuating and responsive members may be pivotally connected or attached to each other to allow at least some degree of freedom or range of motion by the actuating member, which may be utilized to move the actuating member into and out of a locked position. According to this embodiment, a user may pivot the actuating member out of a locked position to allow the present device to slide freely along the sliding axis of the one or more slides. With the actuating member unlocked, the user may move the present device to a desired position along the sliding axis, such as to move the drive wheel into, or out of, engagement with the front wheel of the wheelbarrow. The actuating member may then be relocked at its new position as desired by the user.

The manner of locking the actuating member in place may vary, but may utilize, for example, a series of structures, grooves, slots, etc., on the actuating member, such as on the side of the actuating member or rod, that may interact, engage or couple with a corresponding surface, hole, projection, etc., of an adjusting plate or other structure, such as a parallel rod, etc., that may be fixedly attached, connected, etc., to the wheelbarrow tray. With these embodiments, the engagement, coupling, etc., between the actuating member and the corresponding adjusting plate or other structure to lock the actuating member in place may result from the actuating member resting on the corresponding surface, hole, projection, etc., of the adjusting plate or other structure, which may be simply due to its own weight and the force of gravity. According to some of these embodiments, slots in the side of an actuating member may be angled slightly to account for its angle of attachment to the frame of the device (e.g., at a nearly perpendicular angle relative to the angle of attachment of the responsive member to the frame) to ensure that such a locking mechanism remains securely engaged and locked during use. As an example, a clamping type lock may engage a structure fixedly attached, connected, etc., to the wheelbarrow that may be positioned in a roughly parallel arrangement with the actuating member and physically connected or linked to the actuating member. In contrast to this simple example with a pivotally mounted rod, however, a responsive member may instead include other components, etc., involving more complex arrangements, such as those explained further below.

According to some embodiments, the actuating member of the slide adjuster may include a piston, and the responsive member may include a cylinder. For example, the actuating member of the slide adjuster may include a rod with threading over at least a portion of the rod that screws into an adjusting plate having a threaded hole of matching size and fixedly mounted, connected, etc., (directly or indirectly) to the wheelbarrow tray, such that the rod may be advanced (moved forward) by turning the rod of the actuating member in one direction and reversed (moved backward) by turning the rod of the actuating member in the other direction (due to the threading). The proximal, rear or back end of the rod may have a handle, dial, knob, lever, etc., to facilitate causing rotation of the rod of the actuating member. According to some of these embodiments, the other distal, forward or front end of the rod of the actuating member may include a piston that is positioned within a cylinder of the responsive member of the slide adjuster, such that forward movement of the rod and piston of the actuating member causes pressure to build up inside cylinder, which then causes forward movement of the cylinder of the responsive member to relieve the build-up of pressure inside the cylinder. As an alternative to the above, the arrangement of a cylinder and piston (or other compression-based mechanism) of a slide adjuster may be reversed.

For example, the actuating member may include a cylinder, and the responsive member may include a rod and piston attached to the frame.

A key advantage of a compression-based slide adjuster, such as a piston-and-cylinder, spring or other biasing mechanism, is that it also serves as a natural shock absorber and/or suspension that will give way and then return to its set position in response to changing or sudden forces, such as those encountered by the front centered wheel in contact with the ground. Such sudden or changing forces may be due to the front wheel rolling over uneven ground or hitting small or large obstructions, such as roots, limbs, rocks, etc., or larger obstacles, such as holes, dips, ditches, etc. In addition to absorbing these forces, such a compression-based responsive member may also function to maintain contact and engagement between the drive wheel and the front centered wheel of the wheelbarrow when these sudden or changing forces or movements are encountered. As discussed further below, a clutch or torque converter may also work to relieve sudden changes in rotational forces or torque due to variability in the amount of contact and slippage between the front wheel of the wheelbarrow and the ground. The combination of a clutch or torque converter with the compression-based responsive slide adjuster may result in a system that maintains relatively even pressure and speed of rotation between the drive wheel and the front wheel of the wheelbarrow regardless of any varying forces encountered during use.

As shown in FIG. 2 (and more clearly below in reference to other figures), the proximal or back end of a rod of the actuating member of a slide adjuster may have a knob or dial 355 that may be turned to cause forward (or reverse) movement of the actuating member due to the mated threading between the rod of the actuating member and an adjusting plate fixed in relation to the wheelbarrow tray. This turning or rotation may be achieved by the hand of a user, or it may be motorized. Obviously, if the rotation of the actuating member is caused by the action of a motor or other machine, then the knob, dial, etc., may not be present, and the rod of the actuating member may instead be coupled to the drive shaft of such a slide adjusting motor. The forward (or reverse) movement of the actuating member may then be imparted to the responsive member of the slide adjuster (not visible) to cause forward (or reverse) movement of the present device or apparatus along with its drive wheel 245. This forward or backward direction of movement of the present device is allowed due to its sliding attachment between the frame 221 of the present device or apparatus and the wheelbarrow tray 101, but this sliding attachment also restricts such movement to the sliding axis of the two slides 223, 224.

Figure 4:
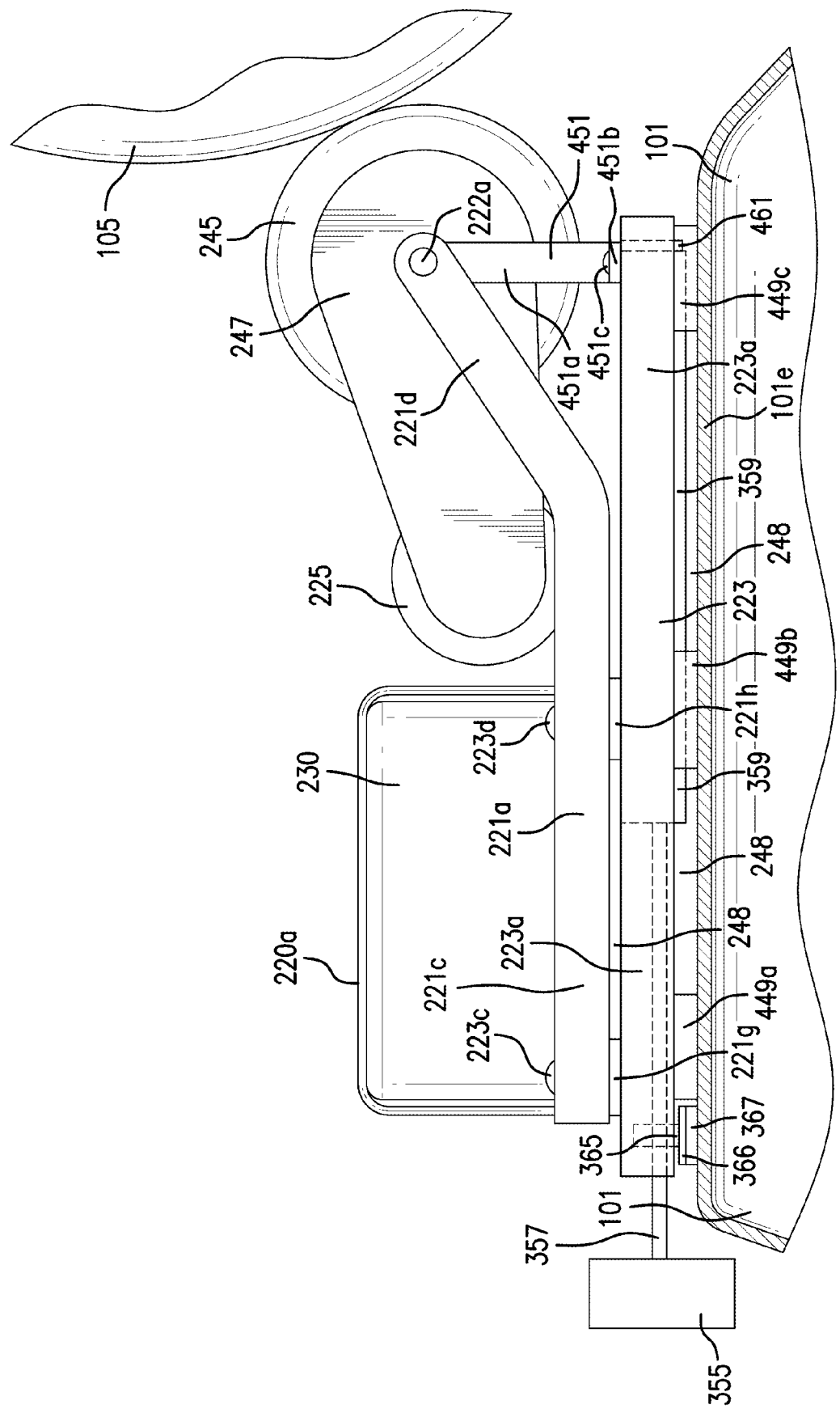
FIG. 4 shows a side view of another device embodiment of the present invention.
Figure 5:
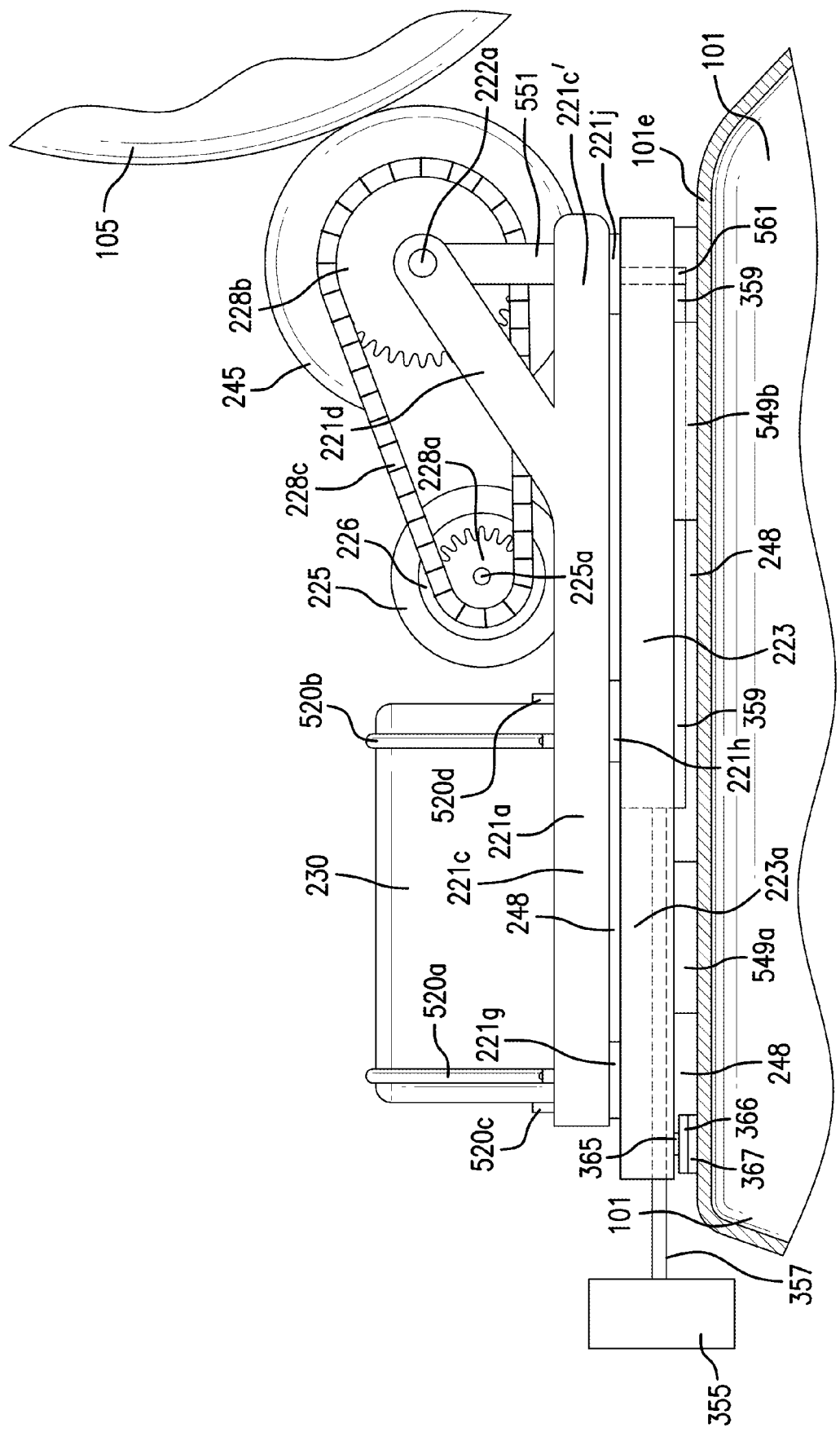
FIG. 5 shows a side view of another device embodiment of the present invention.

The actuating member of the slide adjuster may also function to keep the present device or apparatus and its drive wheel in a fixed position relative to the wheelbarrow tray and front centered wheel when the actuating member of the slide adjuster is not being moved by a user, such as by frictional or locking mechanisms. Thus, a user may adjust the positioning of the present device or apparatus and its drive wheel by operating the actuating member of the slide adjuster until a desired position in reached. For example, with the rotated rod having threading that matches the size and threading of a hole in an adjusting plate, the resistance and friction between the mated threading surfaces will cause the actuating member to remain generally stationary or motionless while no rotational force is applied by a user. When the user stops moving the actuating member, the position of the present device or apparatus and its drive wheel may be held in place due to the inherent friction, resistance, etc., between the rod of the actuating member and the hole in the adjusting plate. By increasing the front-to-back thickness of the adjusting plate and the length of the threaded hole in the adjusting plate and/or by increasing the thread density (i.e., decreasing the pitch) of the matched threading, the amount of resistance or friction between the contacting thread surfaces of the rod and adjusting plate may be increased. Although a smaller thickness is shown for the adjusting plate is shown in FIGS. 3-5 for simplicity, the front-to-back thickness of the adjusting plate and the front-to-back length of the adjusting plate hole may be substantially longer than presented in those figures and may even extend much or most of the distance between a first point near the back of the bottom wall of the tray and/or the back end(s) of the stationary members of the slide(s) to a second point near the back end of the cylinder. However, there would need to be a distance of separation between the back end of the cylinder and the front end of the adjusting plate to allow for a freedom of movement of the sliding portions of the present apparatus along the sliding axis of the slides. The resistance between the threads of the actuating rod and the adjusting plate hole may also be increased by reducing any tolerance or spacing between them (i.e., by making a tighter fit). In addition, a locking mechanism may be used to hold the actuating member in place and/or to enhance or augment the inherent friction, resistance, etc., of the actuating member to secure or hold the desired positioning of the device and its drive wheel during operation and use.

An advantage with this kind of threaded engagement between the actuating member and the adjusting plate as described above is that the positioning of the actuating member, and thus the positioning of the present device and its drive wheel, may be finely tuned over a continuous range. According to some embodiments, an optional pressure sensor may be used to communicate to a user when a desired pressure is achieved inside the cylinder of a slide adjuster indicating a desired or predetermined normal force of contact between the drive wheel and the front centered wheel. Such a pressure sensor may communicate a pressure level or simple pressure threshold. For example, a red LED light may be presented to the user when an insufficient (or too much) pressure inside the cylinder and thus force of contact between the two engaging wheels is present, whereas a green LED light may indicate a sufficient or appropriate pressure within the cylinder and thus a desired or predetermined normal force of contact between the two contacting wheels. A separate indicator may also be provided to communicate to the user the level of fuel/charge remaining in the fuel/power source or battery.

As an alternative to a slide adjuster having a piston and cylinder operating by compression or reduction of pressure inside the cylinder to cause movement of a responsive member, the positioning of a responsive member may instead be determined partly due to the action of a compression spring or other biasing element (i.e., instead of changes in air or hydraulic pressure) that may also function as a shock absorber and suspension unlike more fixed connections between actuating and responsive members. Any number of arrangements may be used to accommodate the use of a spring or the like to perform the dual suspension and responsive movement functions. For example, a cylinder or plurality of guides, rails, etc., may be used to restrict the forward and back motion of the actuating and/or responsive members to a single front-to-back axis. For example, a disk, plate, piston, etc., on a rod of an actuating member, such as at or near a distal end of the rod, may be engaged and/or contacted directly or indirectly with a spring on its distal side. The spring itself as well as the disk, plate, piston, etc., of the actuating member may be restrained in its movement to a single front-to-back axis by being surrounded by the cylinder or plurality of guides, rails, etc., of the actuating and/or responsive member(s) of the slide adjuster. Thus, advancing the actuating member forward would cause compression of the spring, and the reversing the actuating member backward would cause the responsive member to stretch and extend. Due to the tendency of the spring to revert to its original shape, either compression or extension will cause the responsive member to move accordingly.

According to an alternative embodiment with a spring or like biasing member, the spring of a slide adjuster may instead be located on the back side of a disk, plate, piston, etc., of an actuating member and attached thereto, and the other end of the spring may be attached to another portion or part of the responsive member and/or the frame. With this arrangement, the reverse effect on the spring happens as a result of the actuating member moving forward or backward. Thus, forward movement of the actuating member causes the spring to stretch or extend, and reverse movement of the spring cause it to become more compressed.

According to other embodiments of the present invention, slide adjuster(s) may be incorporated into one or more of the slide(s) themselves to function as a slide locking mechanism. For example, one or more stopper(s) or locking mechanisms may be incorporated into the one or more of the slide(s) with the stopper(s) physically attached, connected, etc., to the respective sliding member of a slide and/or the present device attached thereto with the stopper(s) able to reversibly engage a surface of the stationary member of the slide and/or the wheelbarrow tray itself. Such stopper(s) may include a shoe or contacting portion that contacts the surface of the stationary member of the slide and/or the wheelbarrow tray to thus restrict, inhibit, etc., sliding movement by the sliding member of the slide and the present device mounted, attached, etc., thereto. The stopper(s) may also engage one or more of a series of teeth, slots, structures, etc., along the length of the stationary member.

Such stopper(s) may also include, and/or be physically linked, attached, connected, etc., to a lever, handle or the like for operation by a user. For example, a user may lift or move the lever to release the engagement and contact between the contacting portion of the stopper(s) and the stationary member of the slide and/or the wheelbarrow tray to allow the sliding member (and the present device attached, etc., thereto) to slide or move. When two or more slides are used and each includes one or more stopper(s) to directly or indirectly lock or hold the position of the sliding member, the user actuated lever, etc., of each stoppers may be linked or joined together as a bar or other common structure that physically connects or bridges them together for their common movement and operation. This may be similar, for example, to the hand-operated lift bar used with non-mechanized car seat slides. When the slide adjuster(s) are incorporated into the slide(s) themselves, the positioning of the slide(s) may be chosen more freely because the space between the two slides is thus not needed to accommodate a separate slide adjuster.

According to some of these embodiments, the stopper(s) may have one or more biasing elements or springs that may bias the stopper(s) into contact and engagement with the stationary member of the respective slide and/or the wheelbarrow tray. As such, the biasing elements or springs would cause the stopper(s) to default to a locked position unless and until the user actively pulls or pushes on the lever, etc., to release the engagement. According to another mechanism, the lever, handle, etc., of the stopper(s) (or connected to the stopper(s)) may be rotated, turned, etc., to cause the contacting portion of the stopper(s) to engage ad clamp down on the stationary member and/or the wheelbarrow tray to thus lock the sliding member into position. Such a lever, etc., may then be rotated, turned, etc., in the reverse or opposite direction to cause the stopper(s) to become released or disengaged from its contact with the stationary member and/or wheelbarrow tray to allow the sliding member to move freely again.

According to yet other embodiments of the present invention, one or more slide adjusters may function in place of the slides such that forward or back movement of the present device and its drive wheel may be achieved without the use of slides. According to these embodiments, the present device and frame may be mounted, attached, etc., to the one or more slide adjusters, which are attached, mounted, etc., to the underside of the wheelbarrow tray. With these embodiments, the slide adjuster(s) may be described as having a stationary member (attached, etc., directly or indirectly to the wheelbarrow tray) and a sliding member (attached, etc., directly or indirectly to the present device or frame) much like the slides discussed above. Because operation of the slide adjuster(s) may cause forward or backward movement of the present device attached, mounted, etc., to a portion thereof, the slides are not needed with these embodiments. As one example of this arrangement, a sleeve with a threaded hole through it may be engaged with a rod, bar, etc., having outer matching threads. Thus rotation of the sleeve engaged with the threaded rod, etc., will cause the sleeve to move along the length of the threaded rod, etc., in a forward or backward direction depending on the direction of rotation. The rotation of the sleeve may be powered manually, for example, by turning a crank, dial, etc., which may be relayed to the sleeve to cause its rotation. Alternatively, the sleeve may be rotated by operation of an electric motor coupled to the sleeve with the motor able to move or slide with the sleeve as it travels the length of the threaded rod due to rotation of the sleeve. This mechanism may be similar, for example, to powered car seat slides of many luxury vehicles that may be controlled via electronic inputs. The motor may be fed power from the power source mentioned above for the main drive motor. According to some of these embodiments, the sliding member of a slide attached, connected, etc., to the present device and frame may comprise the sleeve in addition to other components, structures, etc., including possibly the motor, and the stationary member attached, connected, etc., to the wheelbarrow tray may comprise the threaded rod, etc., in addition to other components, structures, etc. Alternatively, the reverse orientation and arrangement of the stationary and sliding members may also be used. Typically, the sleeve of one member of the slide in either orientation will not be directly attached to the present device or to the wheelbarrow tray due to its rotation during use.

Figure 3A:
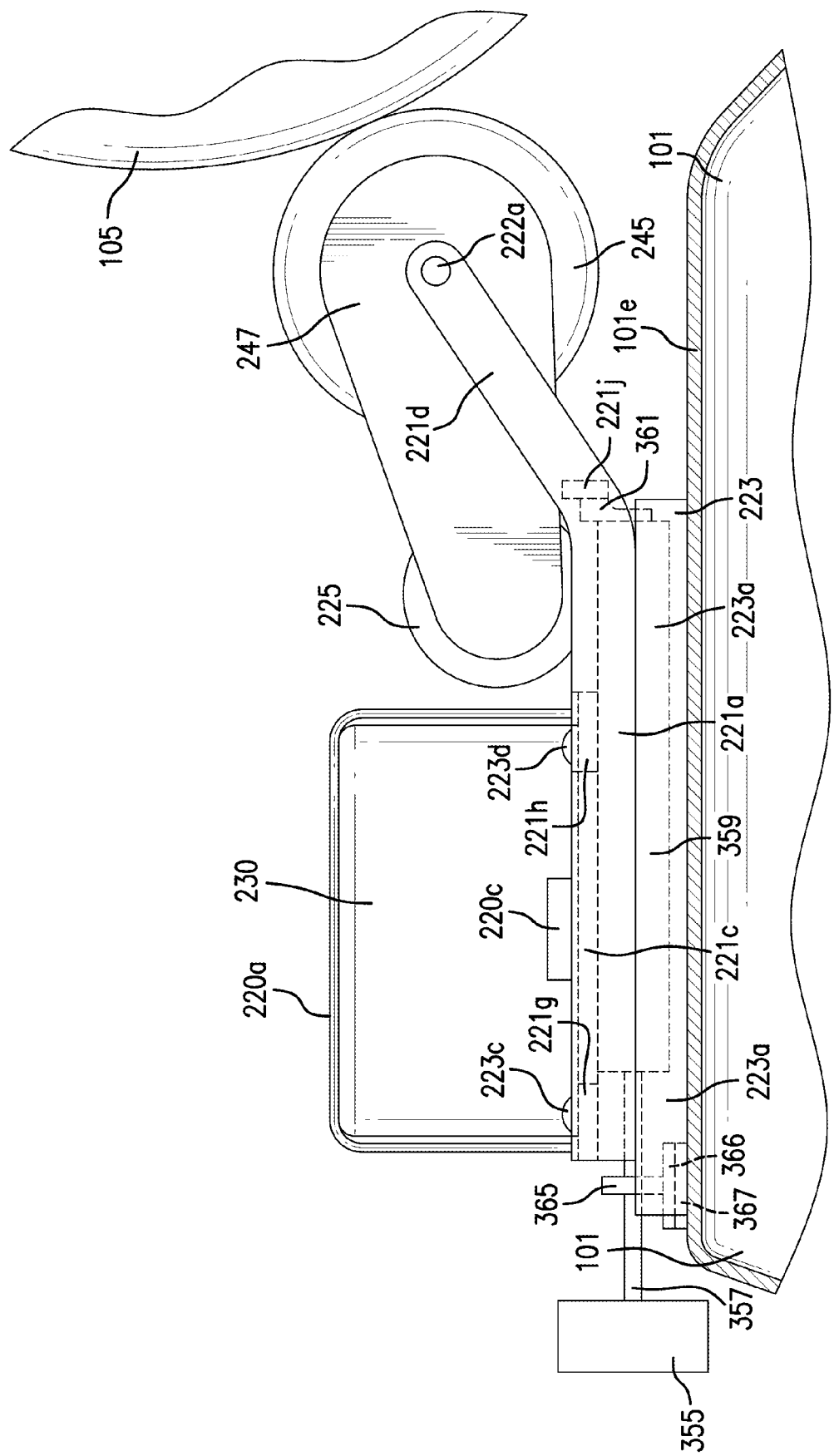
FIG. 3A shows a side view of a device embodiment of the present invention mounted to the underside of a wheelbarrow tray with the drive wheel of the device in contact with the front wheel of the wheelbarrow in a direct wheel-on-wheel engagement as viewed from the perspective of plane A-A indicated in FIG. 2.

FIG. 3A presents a side view of the apparatus or device of the present invention shown in FIG. 2 attached, mounted, etc., to the underside of the wheelbarrow (from the perspective of a plane indicated by arrows A-A in FIG. 2) with drive wheel 245 contacting and engaged with the centered front wheel 105. As described in reference to FIG. 2, the apparatus or device is attached, mounted, etc., to the underside of the bottom 101e wall of the tray 101. The first main frame member 221a is shown attached to the sliding member 223b (not visible) of the first slide 223 via a first slide fastener 223c and a second slide fastener 223d. As mentioned previously, a different manner of attachment between the first main frame member 221a and the sliding member 223b of the first slide 223 could also be used. The stationary member 223a of the first slide 223 is also shown attached to the underside of the bottom wall 101e of the tray 101, which may be by any suitable means as indicated above, such as by fastening, welding, etc. Although not visible in FIG. 3A, the second main frame member 221*b* is also attached to the sliding member 224*b* (not visible) of the second slide 224 via a first slide fastener 224*c* and a second slide fastener 224*d* (not visible). As mentioned previously, a different manner of attachment between the second main frame member 221*b* and the sliding member 224*b* of the second slide 224 could also be used. The stationary member 224*a* of the second slide 224 is also attached to the underside of the bottom wall 101*e* of the tray 101, which may be by any suitable means as indicated above, such as by fastening, welding, etc.

The power source or battery 230 is also shown held in place by the lateral frame members 221*g*, 221*h* and holding structures, including a first holding structure 220*a* and a second holding structure 220*b* (not visible). A first side holding structure 220*c* is also shown extending out from the first main frame member 221*a* and wrapping around the power source or battery 230 to help hold or secure the power source or battery 230 in place, and a second side holding structure 220*d* (not visible) extending out from the second main frame member 221*b* and wrapping around the power source or battery 230 may also help to hold or secure the power source or battery 230 in place on the other side.

The device or apparatus of FIG. 3A further shows the motor 225 mounted to the frame 221 and coupled to the drive wheel 245 and drive wheel axle 246 by a drive chain connecting a sprocket mounted, etc., on the drive axle and a sprocket mounted, etc., to the drive shaft of the motor. The drive chain and sprockets are not visible due to the presence of the drive chain cover 247. The drive wheel 245 and drive wheel axle 246 may be held in place by their attachment, etc., to the forward portions of the main frame members, such as their attachment to the forward portion 221*d* of the first main frame member 221*a* by wheel-mounting fastener 222*a* and the forward portion 221*f* of the second main frame member 221*b* by wheel-mounting fastener 222*b* (attachment to the second main frame member is not visible). One or more clutches may also be used (not shown) as elaborated further below.

A slide adjuster is further depicted in FIG. 3A including a rod 357 (i.e., actuating member) and cylinder 359 (i.e., responsive member), the rod 357 having a piston (not shown) at its distal end inside the cylinder 359 and a knob or dial 355 at its proximal end. According to this embodiment, the rod 357 and cylinder 359 are positioned within a space or gap 348 (not visible) between the first slide 223 and the second slide 224 and between the bottom wall 101*e* of the wheelbarrow tray 101 and the power source 230 and motor 225. The slide adjuster components including the knob 355, rod 357, and cylinder 359 may be positioned along a front-to-back center axis and/or at or near the front-to-back center plane of the wheelbarrow 100 or tray 101. On the other hand, each of the first and second slides 223, 224 may be offset from the front-to-back center plane of the wheelbarrow 100 or tray 101, such as at or near where at least a portion of the main frame members are located.

The responsive member, such as a cylinder, spring, etc., of a slide adjuster may be attached to the frame at one or more locations by any suitable method including fastening, welding, etc. For example, the cylinder 359 in FIG. 3A may be attached on its side to the second lateral frame member 221*h* and at its distal end to a cylinder end frame member 361. Although not shown in FIG. 3A, the side of the cylinder 359 may also be attached to the first lateral frame member 221*g* near the proximal end of the cylinder 359. The cylinder end frame member 361 may be attached to the frame 221, such as to at least one lateral frame member that is attached to one or more main frame members. For example, as depicted in FIG. 3A, the cylinder end frame member 361 may be attached to a lateral frame member 221*j* bridging between the first and second main frame members 221*a*, 221*b*. Any suitable manner of fixed attachment between the distal end of the cylinder 359 and the cylinder end frame member 361, including fastening, welding, etc., may be used. Likewise, any suitable manner of fixed attachment between the cylinder end frame member 361 and the lateral frame member 221*j* may also be used. As an alternative, the cylinder end frame member 361 may be absent, and the distal end of the cylinder 359 may be fixedly attached to the lateral frame member 221*j* by any suitable method.

The rod 357 of the slide adjuster shown in FIG. 3A may be moved forward or backward by rotation of the knob 355 clockwise or counter-clockwise. The rod 357 further includes a threaded portion between the knob and the piston that engages a matching threaded hole in an adjusting plate 365 with the adjusting plate 365 mounted on a first base plate 366 and the first base plate 366 mounted to a second base plate 367. The adjusting plate 365 may be approximately perpendicular to the two base plates 366, 367 when mounted. The adjusting plate 365 may be fixedly and permanently mounted, such as by welding, etc., to the first base plate 366, and the second base plate 367 may be mounted, such as by welding, etc., to the underside of the bottom wall 101*e* of the tray 101. The additional use of the second base plate 367 may help to reinforce the bottom wall 101*e* of the tray 101, which might not be strong or thick enough to hold the first base plate 366 and fastener(s) in attachment over a length of time and use. The first base plate 366 may also be attached to the second base plate 367 by any suitable method, such as by fastening, welding, etc., to place the adjuster plate 365 into position to receive the rod 357 of the slide adjuster through the hole of the adjuster plate 365. If a fastener is not used to connect the first and second plates 366, 367, then a single base plate may be used to attach or connect the adjuster plate 365 to the underside of the wheelbarrow tray 101.

With the rod 357 threaded into the hold of the adjuster plate 365, rotation of the knob 355 (and thus rotation of the rod 357) will cause the piston at the distal end of the rod 357 to move forward or backward depending on the handedness and direction of the matched threading of the rod and adjuster plate hole. Rotation of the knob 355 and rod 357 in one direction will cause the piston inside the cylinder 359 to advance forward, whereas rotation of the knob 355 and rod 357 in the other direction will cause the piston to retreat backward. Forward motion of the piston at the distal end of the rod 357 will cause pressure to build up inside the cylinder 359 (at least transiently), and reverse motion of the piston at the distal end of the rod 357 will cause pressure inside the cylinder 359 to be reduced (at least transiently). In response to the change in pressure, the cylinder 359 may move forward (to relieve a build-up of pressure) or backward (to counteract a reduced pressure) to thus restore a resting pressure inside the cylinder 359, which might be about the same as the surrounding atmospheric pressure. As a result, the cylinder 359 will be advanced forward (to relieve a build-up of pressure in the cylinder 359) or moved backward (to counteract a reduced pressure in the cylinder 359). Since the frame 221 of the present apparatus with its drive wheel 245 and other components is attached to the cylinder 359, the frame 221 of the present apparatus with its drive wheel 245 and other components will also be advanced or moved backward in response to the forward or backward movement, respectively, of the rod 357 and piston.

Figure 3B:
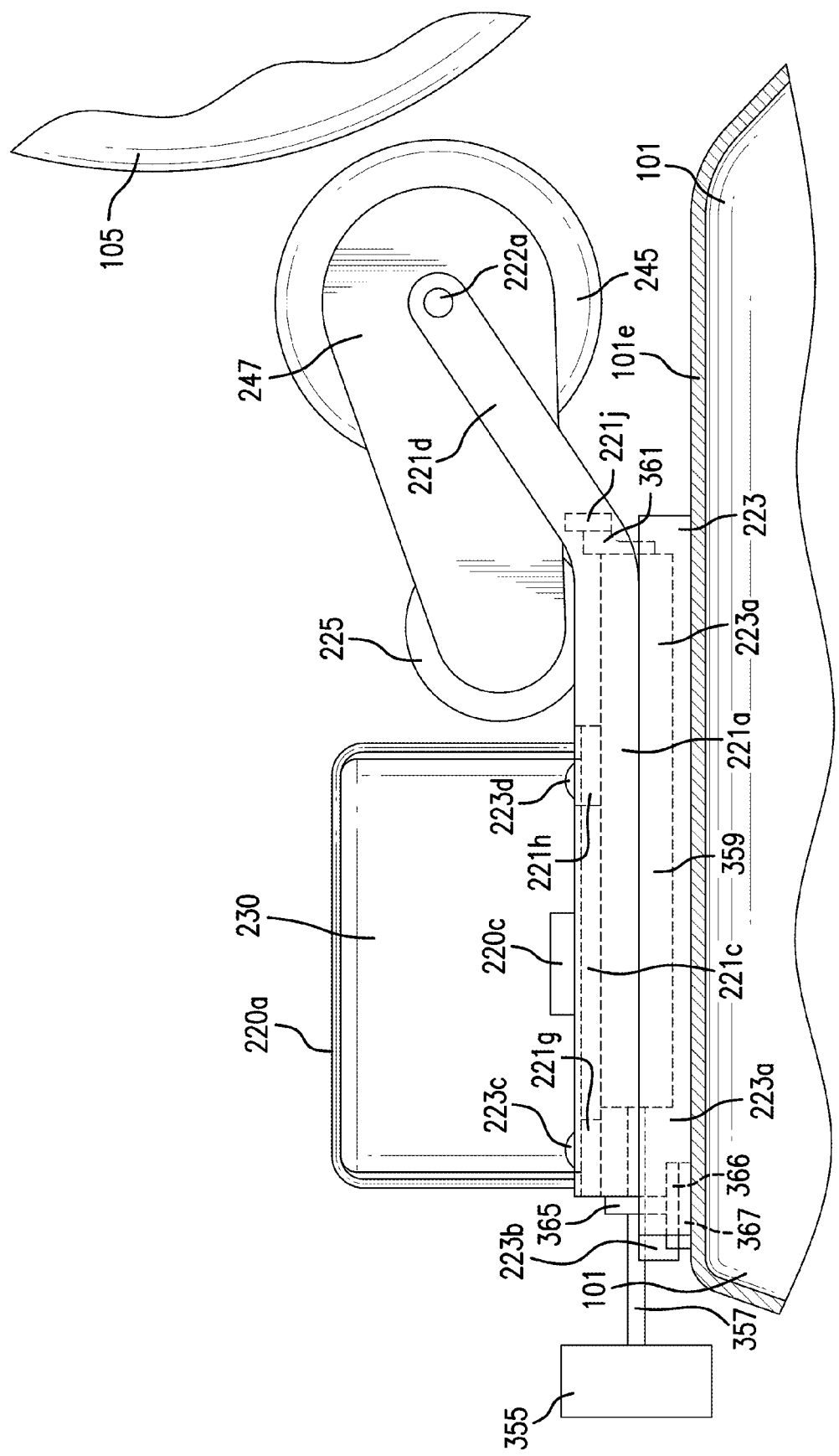
FIG. 3B shows a side view of the device shown in FIG. 3A with the drive wheel disengaged from the front wheel of the wheelbarrow.

FIG. 3A shows an embodiment of a device or apparatus of the present invention attached to the underside of the wheelbarrow with the drive wheel 245 contacting and engaged with the centered front wheel 105 of the wheelbarrow 100. FIG. 3B shows the same embodiment of a device or apparatus of the present invention as in FIG. 3A but with the drive wheel 245 disengaged and distanced from the centered front wheel 105 of the wheelbarrow 100. As can be seen, by rotating the knob 355 in one direction, the positioning of the rod 357 and its piston is moved backward, which then pulls the cylinder 359 backward. Due to the fixed connection between the cylinder 359 and the frame 221, this movement also causes the frame of the present apparatus shown in FIG. 3A with its drive wheel 245 and additional components to move backward by relative movement between the stationary member 223a, 224a and the sliding member 223b, 224b of each of the first and second slides 223, 224. As can be seen in FIG. 3B, in a disengaged position, the sliding member 223b, 224b of each slide 223, 224 extends out of (or further out of) the corresponding stationary members 223a, 224a. As a result, the drive wheel 245 is no longer in contact and engaged with the front centered wheel 105 of the wheelbarrow 100. To restore contact and engagement between the drive wheel 245 and the front centered wheel 105 of the wheelbarrow 100, the knob 355 may be turned in to the other direction to advance the piston at the distal end of the rod 357 to build up pressure in the cylinder 359 and cause the frame 221 and sliding components of the present apparatus to advance forward until the drive wheel 245 is again in contact and engagement with the centered front wheel 105.

The drive wheel 245 is also shown in FIGS. 2 and 3 as having a rounded and convex outer cross-sectional shape with an outer edge or circumference at the furthest reach or outermost circumference of the drive wheel 245 along or within the mid-plane of the drive wheel 245. With the presently proposed wheel-on-wheel engagement, the outer area or portion of the drive wheel of the present invention that contacts the front wheel of the wheelbarrow at one point in time and/or over the course of time, such as during one full revolution of the drive wheel, may be referred to generally as an "outer contacting area" of the drive wheel regardless of its shape. The term "total outer contacting area" may refer more specifically to the outer contacting area of the drive wheel that contacts the front wheel during one full revolution of the drive wheel. Thus, the size and extent of this outer contacting area of the drive wheel that contacts the front wheel of the wheelbarrow will depend on the outer cross-sectional shapes of both the drive wheel and the front wheel of the wheelbarrow.

In the example embodiment shown in FIGS. 2 and 3, mostly the outer edge or circumference of the drive wheel 245 would contact and engage an outer edge or circumference of the centered front wheel 105 of the wheelbarrow due to its rounded or convex shape. However, the drive wheel may have a variety of different cross-sectional shapes, such as a squared or even a concave outer shape (not shown), possibly depending on the cross-sectional shape of the front wheel of the wheelbarrow, to increase the amount of surface area of the drive wheel that contacts the centered front wheel during their engagement. The width of the drive wheel may also be relatively greater to increase its contact with the front wheel. For example, the width of the drive wheel according to some embodiments may be approximately the same, or slightly less than (e.g., about a half-inch or less than), the diameter of the inner rim of the front wheel of the wheelbarrow. The front wheel of the wheelbarrow may also (or instead) have different cross-sectional shapes, such as convex, squared, concave, etc., that correspond to the shape of the drive wheel. In addition, the drive wheel 245 is shown in FIGS. 2 and 3 to have a smooth surface, but the drive wheel may instead have a rough or coarse surface to increase the friction and traction between drive wheel and the centered front wheel of the wheelbarrow and to reduce or minimize any slippage between them. Since the front wheel of the wheelbarrow is designed for contact with the ground, the drive wheel may have a frictional outer surface that is similar or analogous to the frictional qualities of a roadway, which may imitate the traction or friction that exists between the front wheel of the wheelbarrow and the ground. Thus, a drive wheel having a hard and rough outer surface may be ideal for use with a front wheel made of rubber. Such a rough outer surface of a drive wheel may have a coarse sand-paper like feel similar to a concrete surface.

Increasing the surface area and/or the amount of friction between the portion(s) of the drive wheel in contact with the front centered wheel may eliminate, reduce or minimize any slippage that might otherwise occur between them. Indeed, the amount of surface area and friction between the drive wheel and front wheel of the wheelbarrow may each be maximized within reason to anticipate slick or wet conditions that may be encountered during use.

The drive wheel may be made of a variety of different hard materials including any suitable metal, metal alloy, plastic, rubber, concrete, composite, etc., and/or any suitable combination thereof, and these material(s) may be formed or made into the drive wheel by any suitable method(s). For example, a drive wheel may have the same or similar composition and construction as a grinding wheel. The drive wheel may be made or constructed of a matrix of coarse particles, etc., that may be pressed or bonded together, and/or the drive wheel may be made of a metal, plastic, etc., with particles, etc., bonded to its surface.

The drive wheel may include a tire portion and an optional inner rim, with the tire portion fitted around the inner rim when present. According to some embodiments, the tire may have a solid construction, or it may include a tread fitted around an inner fluid-filled tube. In any case, the drive wheel may optionally further include other reinforcing structures. The drive wheel may be made of two or more different parts and/or two or more different materials, such as a tire portion and inner rim, and the outer surface of the drive wheel contacting the centered front wheel may comprise a separate and/or special material or coating that may provide for greater friction. The drive wheel may be mounted, etc., on the drive wheel axle by its inner rim. From the center of its axle, the drive wheel may have a diameter that varies within a range from about 2 inches to about 15 inches, or alternatively in a range from about 3 inches to about 10 inches, or alternatively in a range from about 4 inches to about 8 inches, or alternatively in a range from about 5 inches to about 6 inches. Alternatively, the diameter of the drive wheel may be within a range from about 3 inches to about 5 inches, or alternatively within a range from about 6 inches to about 8 inches. Although higher diameters are conceivably possible, the drive wheel may generally have a diameter that is less than about 10 inches. The drive wheel may also have a width that varies within a range from about 0.5 inch to about 5 inches, or within a range from about 1 inch to about 4 inches, or within a range from about 1 inch to about 3 inches, since a typical front wheel of a wheelbarrow may be about 3 inches in width. Generally, the drive wheel will have a diameter that is significantly or substantially less than the diameter of the centered front wheel of the wheelbarrow.

FIG. 4 presents a side view of another embodiment of the present invention from a similar perspective as in FIG. 3 with the drive wheel 245 engaged with the centered front wheel 105 of the wheelbarrow 100. Differences between the embodiments shown in FIGS. 3 and 4 include longer slides 223, 224, different positioning of the first and second lateral frame members 221g, 221h, the addition of spacers 449a, 449b, 449c, and additional drive wheel support(s) 451, 452 forming part of the frame 221 to help reinforce and strengthen the positioning of the drive wheel 245. As an additional difference from the embodiment of FIG. 3, the distal end of the forward portion 221d of the first main frame member 221a is shown having a closed hole instead of a forked end for attachment of the drive wheel 245 by wheel-mounting fastener 222a. The distal end of the second main frame member may have a similarly closed hole instead of a forked end for attachment of the drive wheel 245 by wheel-mounting fastener 222b. Other than these differences, the embodiment shown in FIG. 4 would generally operate in a similar fashion to the embodiment shown in FIGS. 2 and 3.

The additional spacers 449a, 449b, 449c in FIG. 4 may be used to increase the gap or space 248 between the power source 230 (and motor 225) of the present device and the wheelbarrow tray 101. In addition, the first and second lateral frame members 221g, 221h are shown positioned between the first main frame member 221a and the first slide 223 to create a small separation between them. Although it is not visible in FIG. 4, the first and second lateral frame members 221g, 221h are also shown positioned between the second main frame member 221b and the second slide 224 to create a small separation between them as well. However, the first and second lateral frame members 221g, 221h could be attached to the inner sides of the main frame members 221a, 221b to reduce or eliminate such separation(s) between the respective main frame members and slides with the power source 230 still situated more internally, within, or between the main frame members 221a, 221b of the frame 221 than is shown in the embodiment of FIGS. 2 and 3. Although FIG. 4 shows the spacers 449a, 449b, 449c between the bottom wall 101e of the tray 101 and the stationary member(s) 223a, 224a of the first and second slides 223, 224, one or more spacers may instead (or additionally) be placed between the sliding member(s) of the slides and the frame of the device (not shown). Since the power source 230 in FIG. 4 is situated more internally between the main frame members 221a, 221b of the device due to the positioning of the lateral frame members 221g, 221h (and thus closer to the wheelbarrow tray 101), the spacers 449a, 449b, 449c may be used to increase the gap or space 248 between the power source 230 (and motor 225) of the present device and the wheelbarrow tray 101 to accommodate the components of a slide adjuster.

According to the embodiment of FIG. 4, a rear portion 221c of the main frame member 221a is shown attached to the sliding member 223b of the first slide 223 by a first slide fastener 223c and a second slide fastener 223d. In addition, one or more drive wheel support(s) may also be present to help support and strengthen the positioning of the drive wheel 245. A first drive wheel support 451 is shown in FIG. 4 with a vertical portion 451a attached at a first end to the drive wheel axle 246 and/or the forward portion 221d of the first main frame member 221a. The first drive wheel support 451 may be attached to the sliding portion 223b of the first slide 223 by a first wheel support fastener 451c inserted through a lateral flange 451b at a second end of the vertical portion 451a of the first drive wheel support 451. Although not visible in FIG. 4, a second drive wheel support 452 may also be present with a vertical portion 452a attached at a first end to the drive wheel axle 246 and/or the forward portion 221f of the second main frame member 221b. The second drive wheel support 452 may be attached to the sliding member 224b of the second slide 224 by a first wheel support fastener 452c inserted through a lateral flange 452b at a second end of the vertical portion 452a of the second drive wheel support 452. According to this arrangement, the drive wheel support(s) 451, 452 will move back and forth in tandem with the rest of the frame 221 of the present device or apparatus along with the sliding members 223b, 224b of the slides 223, 224 and the other components of the present device or apparatus that are attached to the frame 221 including the power source 230, motor 225, and drive wheel 245.

According to the embodiment shown in FIG. 4, spacers 449a, 449b, 449c are further provided between the first slide 223 and the bottom wall 101e of the wheelbarrow tray 101. Although not visible in FIG. 4, similar set of spacers may also be present between the second slide 224 and the bottom wall 101e of the wheelbarrow tray 101. Even though the spacers 449a, 449b, 449c are shown overlapping vertically with the positioning of the lateral frame members 221g, 221h (when the wheelbarrow is in an upright position), the spacers may instead be positioned at locations that are not vertically aligned with the lateral frame members. The spacers themselves may be made of one or more pieces, and may be made of a variety of different suitable materials, including metal, plastic, rubber, etc. According to these embodiments, the stationary members 223a, 224a of each slide 223, 224 may be attached to the bottom wall of the wheelbarrow via the spacers. For example, in addition to a fastener (not shown) being inserted through the stationary member of a slide and the bottom wall of the tray, such a fastener may also be inserted through a respective spacer. Alternatively, the stationary member of the slide may be fixedly attached to the spacer by other suitable methods, such as welding, etc., and/or the spacer may be fixedly attached to the bottom wall of the tray by other suitable methods as well, such as welding, etc. As yet another alternative, one or more spacer(s) may be sandwiched between the stationary member of its respective slide and the bottom wall of the tray at a different position from a fastener(s) used to secure the stationary member to the tray such that the fastener(s) is/are not inserted through the spacer.

To maintain alignment and balance of the present device or apparatus, the thicknesses of laterally corresponding spacers for both the first and second slides 223, 224 will preferably be about the same, and the spacers for each of the slides may be positioned at the same or similar distances along a front-to-back axis of each slide (i.e., at approximately equal distances along the lengths of the respective slides measured from the forward and/or back end of each slide). Spacers for two or more slide that are similarly positioned along the length of their respective slides may be referred to jointly as laterally corresponding spacers. Thus, these "laterally corresponding spacers" may refer to two or more spacers for two or more slides that are located at an approximately equal distance from at least one end of the respective slides (assuming that at least one of the ends of those respective slides are aligned with each other in a plane perpendicular to the front-to-back center plane of the wheelbarrow or wheelbarrow tray). Especially if the two or more slides do not have ends that are aligned with each other, the "laterally corresponding spacers" may be defined instead as being spacers for the two or more slides that are generally aligned with an imaginary line that is approximately perpendicular to a front-to-back center axis of the wheelbarrow (or wheelbarrow tray).

According to some embodiments, each of the slides of a present device or apparatus may have an equal number of spacers, and/or all of the spacers for both slides may have approximately the same thickness (e.g., as depicted in FIG. 4). However, other embodiments are also envisioned. For example, one or more spacers for each of the slides may be positioned at different distance(s) along the length of the respective slide. It is also possible that spacers for each slide may have different thicknesses (e.g., a decreasing or increasing thickness in one direction along the length of the respective slide). Such an ordered increasing or decreasing thickness of the spacers may be used to tilt the device or apparatus of the present invention at a non-parallel angle relative to the bottom wall of the wheelbarrow tray. However, such tilting caused differing thicknesses of the spacers would preferably maintain the general alignment of the respective mid-planes of the drive wheel and the centered front wheel of the wheelbarrow, such as by keeping the angles between the first and second slides and the bottom wall of the wheelbarrow tray approximately equal. As yet another variation, the spacers may have different lengths in their front-to-back dimensions when attached to a wheelbarrow tray.

According to the embodiment of FIG. 4, the responsive member or cylinder 359 of the slide adjuster is further shown attached on its side to the lateral frame member 221h and at its distal end to a cylinder end frame member 461. Such a cylinder end frame member 461 may be fixedly attached (directly or indirectly) by any suitable method, such as by fastening, welding, etc., to the frame 221, one or both of the sliding member(s) 223b, 224b of the slides 223, 224, and/or the drive wheel support(s) 451, 452. Similarly to the embodiment of FIG. 3, the adjuster plate 365 is further shown mounted to the underside of the tray via base plates 366, 367, such that the rotation of the actuating member/rod 357 with its piston inside the responsive member/cylinder 359 may cause forward or reverse movement of the rod 357 and responsive movement of the cylinder (and the rest of the present apparatus attached to the frame) by relative movement of the sliding members 223b, 224b of the slides 223, 224.

FIG. 5 presents a side view of yet another embodiment of the present invention from a similar perspective as in FIGS. 3 and 4 with the drive wheel 245 engaged with the centered front wheel 105 of the wheelbarrow 100. The embodiment in FIG. 5 depicts some additional variations in the design of a device or apparatus of the present invention. The first main frame member 221a is shown having both an angled forward portion 221d and an extended portion 221c' that may be approximately co-linear with the rear portion 221c of the first main frame member 221a. The second frame member 221b in this embodiment may be similarly described. Although not visible in FIG. 5, the second main frame member 221b may also have both an angled forward portion 221f and an extended portion 221e' that may be approximately co-linear with the rear portion 221e of the second main frame member 221b. The lengths of the extended portions 221c', 221e' may vary. These extended portions 221c', 221e' may also be referred to as extended forward portions. A third lateral frame member 221j is further shown bridging between extended portions 221c', 221e' of the main frame members 221a, 221b.

According to the embodiment in FIG. 5, one or more additional wheel support(s) may also be optionally present. A first wheel support 551 is shown that may be attached at or near a first end to the drive wheel axle 246 and/or angled forward portion 221d of the first main frame member 221a. Similarly, a second wheel support 552 may also be attached at or near a first end to the drive wheel axle 246 and/or angled forward portion 221f of the second main frame member 221b. Each of the first and/or second wheel supports 551, 552 may be attached at or near their second end(s) to the third lateral frame member 221j, sliding portion(s) of the first and/or second slide(s) 223, 224, and/or extended portion(s) 221c', 221e' of the first and second main frame members 221a, 221b. The slide adjuster shown in FIG. 5 is similar to the slide adjusters in FIGS. 2-4. The distal end of the responsive member/cylinder 359 is further shown fixedly attached, mounted, etc., to a proximal face of a cylinder end frame member 561, and the cylinder end frame member 561 may also be fixedly attached, etc., to the frame 221, such as third lateral frame member 221j. In addition, the first slide 223 is shown separated from the bottom wall of the wheelbarrow tray 101 by two spacers 549a, 549b of different lengths, which may be used to indirectly attach the stationary member 223a of the first slide 223 to the wheelbarrow tray 101. Similar spacers 549d, 549e may also be positioned between the second slide 224 and the wheelbarrow tray 101.

An alternative arrangement is further shown in FIG. 5 to keep the power source or battery 230 in place. A first holding structure 520a and a second holding structure 520b are shown in FIG. 5 in a perpendicular orientation relative to the holding structures shown in the figures described above. Due to their different orientation, the holding structures 520a, 520b may be attached to the first and second frame members 221a, 221b (as shown) and/or to the lateral frame members 221g, 221h. Additional side holding structures may also be present, such as the first side holding structure 520c and the second holding structure 520d at or near the back and front ends, respectively, of the power source 230. These first and second side holding structures 520c, 520d may be fixedly attached to the frame, such as to the first and second lateral frame members 221g, 221h, respectively.

The embodiment of the present invention in FIG. 5 is further shown with the drive chain cover absent or removed. As can be seen, a first drive sprocket 228a is shown attached or mounted to the drive shaft 225a of the motor 225, and a second drive sprocket 228b is shown attached or mounted to the drive wheel axle 246 and/or the drive wheel 245. The two drive sprockets are further shown as joined or coupled by a drive chain 228c. Due to the drive chain only reaching from the motor 225 to the drive wheel axle 246 (and not the axle of the centered front wheel 105), the drive assembly of the present invention adds less weight to the wheelbarrow overall (and also less unbalancing if the drive chain is off-center). According to many embodiments, the second drive sprocket 228b may be larger in diameter than the first drive sprocket 228a. The first drive sprocket 228a may be attached, joined, etc., to the drive shaft 225a and the second drive sprocket 228b may be attached, mounted, joined, etc., to the drive wheel axle 246 by any suitable method, such as welding, splining, keyed joining, etc. As mentioned above, a belt could alternatively be used in place of a drive chain to couple pulleys on the drive shaft and drive wheel axle (or drive wheel).

The drive mechanism of the present invention for coupling the motor to the drive wheel axle and/or drive wheel may be designed to sufficiently power rotation of the centered front wheel of the wheelbarrow to carry out most or all of the work of transporting a wheelbarrow load, or only to assist or help the user in transporting the load. The drive motor is rotationally coupled to the drive wheel via the drive mechanism, such that the powered rotation of the drive shaft by the rotational action of the motor is imparted to the drive wheel and/or drive wheel axle (and thus imparted to the centered front wheel of the wheelbarrow as well due to the contact and pressure between the drive wheel and the centered front wheel). How much rotational power or torque is imparted to the centered front wheel of the wheelbarrow may depend largely on how much force is delivered from the motor to the drive mechanism and drive wheel, as well as the amount of contact area, normal force and friction between the drive wheel and the front centered wheel of the wheelbarrow. With a drive chain, the amount of force or torque delivered to the drive wheel is dependent on the strength and level of operation of the motor, as well as the presence of any clutch or torque converter between the motor and the drive wheel that impose limits on the amount of torque delivered to the drive wheel.

According to embodiments of the present invention, one or more suitable clutch(es) and/or torque converter(s) may be used to join the respective sprocket(s) to the drive shaft 225a and/or drive wheel axle 246. Although these clutch(es) and/or torque converter(s) may be specifically designed for a present device or apparatus, they may function generally and/or conceptually similarly or the same as clutch(es) and/or torque converter(s) known in the art. According to these embodiments, the respective sprocket(s) 228a, 228b may be coupled to the clutch (or torque converter) or joined to the clutch (or torque converter) itself. Each of the clutch(es) (or torque converter(s)) may be joined, etc., to the drive shaft 225a and/or drive wheel axle 246 by any suitable method, including welding, splining, keyed joining, etc. Such clutch(es) (or torque converter(s)) may also link, join, connect, etc., the drive shaft 225a and/or drive wheel axle 246 to the respective sprocket(s). For example, a clutch 226 is shown in FIG. 5 that joins the drive shaft 225a to the first drive sprocket 228a. However, a clutch could instead (or additionally) be present on the drive wheel axle 246 and coupled to the second sprocket 228b.

The presence of a clutch or torque converter on either or both of the drive shaft 225a and/or drive wheel axle 246 results in their being limits on the amount of torque that may be imposed on the components of the drive mechanism, including the drive chain 228c, motor 225 and drive wheel 245. Large or sudden changes (or possibly any change) in the amount of torque required to rotate the drive wheel engaged with the front centered wheel 105 of a wheelbarrow may place strain and wear on the components of the drive mechanism and create additional wear on the front centered wheel 105 of the wheelbarrow. Thus, at least one clutch (or torque converter) may be added to place lower and/or upper limits on the amount of torque transmitted to the drive chain 228c, drive wheel axle 246, and/or drive wheel 245. For example, a centrifugal clutch may be used that results in both a minimum and maximum torque that will be delivered to the drive chain 228c, drive wheel axle 246, and/or drive wheel 245. With a centrifugal clutch, a lower threshold is imposed due to a minimum amount of centrifugal force (generated by rotation of the drive shaft 225a of the motor 225) needed to cause the shoes of the clutch to overcome their inward biasing and extend outward and engage the inner flange surfaces of a corresponding bell. The shoes and bell are able to spin independently about the axis of rotation and only rotate in tandem when they become engaged. Thus, the independently rotating components of the clutch may be used to join two elements to cause their rotation in tandem when the components of the clutch become engaged. In addition to having a lower threshold, a clutch (e.g., a centrifugal clutch) may also have an upper torque limit or threshold caused by slippage between the opposing surfaces of the clutch components. Whether coupled to the drive shaft or drive wheel axle, a centrifugal clutch may be oriented along the rotational axis of the drive shaft with either the bell or the shoes on the outside (i.e., further away from the motor or drive wheel) relative to each other. Other types of clutches, including friction-based clutches known in the art, may also be used. If a belt and pulley system is used in place of a drive chain, a natural upper torque limit may be provided due to slippage between the belt and pulleys, but this upper limit for belts may be lower than preferred for use with the present invention.

According to another broad aspect of the present invention, various methods are provided for assembling the present device and/or attaching it to a wheelbarrow or wheelbarrow tray as described herein. The present methods further include operating and/or using the present device in conjunction with a wheelbarrow as described herein, which may further include engaging and/or disengaging the drive wheel of the device with a front wheel of a wheelbarrow due to a sliding attachment of a present device to a wheelbarrow. Such operating methods may further include controlling when a drive motor acts to power and impart rotational motion to the drive wheel. Such control of the drive motor may be performed by operating a switch or other electronic control that may be accessible to a user and connected to the present device by a wired or wireless communication.

The rotational motion and power generated by the motor may be imparted to the drive wheel via a drive mechanism that rotationally couples the drive motor to the drive wheel, which then exerts a torque on the front wheel of the wheelbarrow due to its direct wheel-on-wheel contact when engaged. Thus, present methods for imparting rotational motion generated by the drive motor to the drive wheel, and ultimately to the front wheel of the wheelbarrow via the drive mechanism, may be further controlled or regulated by the engagement/disengagement between the drive wheel and the front wheel as described herein, which may be further controlled by operation, movement, maneuvering, etc., of a slide adjuster, the slide adjuster being operated by hand or possibly powered by a motor. Such a step of controlling, movement and/or maneuvering the slide adjuster may comprise rotating an actuating member when the actuating member is engaged with a fixed adjusting plate having a hole with matching threads. Such translating or rotational movements of the actuating member may cause the present device to slide forward or backward as described herein depending on the direction of movement of the actuating member due to its further attachment to a responsive member of the slide adjuster, the responsive member being attached to the present device or its frame.

Methods of the present invention further include methods for assembling the present device as described herein. Such methods may include constructing or assembling a frame, which may comprise several main and/or lateral frame members, by any suitable method as described herein. Such methods may include attaching the various components such as the motor, power/fuel source, etc., to the frame, attaching the drive wheel to the frame, such as by its drive wheel axle, and/or mounting the drive wheel on its axle, and/or suitably attaching or assembling other components, such as those of the drive mechanism as described herein, which may include sprockets or pulleys, a chain drive or belt, clutch, torque converter, etc., associated with the drive shaft of the drive motor and/or the drive wheel axle. Methods of the present invention may further include attaching the present device to a wheelbarrow tray as described herein, such as by one or more slides or other forms of attachment. Such sliding attachment may be by coupling, attaching, engaging, etc., the sliding member(s) of the slide(s) (attached to the present device) to the stationary member(s) of the slide(s) (attached to the wheelbarrow tray), or by reversible attachment of the present device or its slides to the wheelbarrow tray.

While the present invention may have been disclosed with reference to certain embodiments, it will be apparent that modifications and variations are possible without departing from the spirit and scope of the invention as defined herein. Furthermore, it should be appreciated that any and all examples in the present disclosure, while illustrating embodiments of the invention, are provided as non-limiting examples and are, therefore, not to be taken as limiting the various aspects so illustrated. The present invention is intended to have its full scope consistent with the following claims, and equivalents thereof. Accordingly, the drawings and description are to be regarded as illustrative and not as restrictive.

What is claimed is:

1. An apparatus comprising:
 a wheelbarrow tray, the wheelbarrow tray having a bottom wall and at least three side walls, wherein the bottom wall and the at least three side walls partially surround an interior containment space; and
 a movement assisting device slidably attached to the underside of the bottom wall of the wheelbarrow tray by one or more slides, the movement assisting device comprising:
  a frame having at least two main frame members including a first main frame member and a second main frame member;
  a drive wheel rotationally mounted on a dive wheel axle, the drive wheel axle being attached to the frame;
  a drive motor rotationally coupled to the drive wheel to impart rotation caused by the action of the drive motor to the drive wheel, the drive motor being fixedly attached to the frame; and
  a power or fuel source for providing power or fuel to the drive motor, the power or fuel source being fixedly attached to the wheelbarrow tray.

2. The apparatus of claim 1, wherein the wheelbarrow tray has at least four side walls including a front wall, a back wall, a first lateral side wall and a second lateral side wall.

3. The apparatus of claim 2, wherein the movement assisting device is slidably attached to the bottom wall of the wheelbarrow tray such that a mid-plane of the drive wheel is approximately aligned with a front-to-back center plane of the wheelbarrow tray.

4. The apparatus of claim 1, wherein the movement assisting device is slidably attached to the underside of the bottom wall of the wheelbarrow tray by two or more slides.

5. The apparatus of claim 1, wherein the movement assisting device is slidably attached to the bottom wall of the wheelbarrow tray indirectly via one or more spacers.

6. The apparatus of claim 1, further comprising:
 a slide adjuster, the slide adjuster comprising an elongated actuating member and a responsive member,
 wherein the elongated actuating member is attached at or near the distal end of the elongated actuating member to the responsive member, and
 wherein the responsive member is fixedly attached to the frame.

7. The apparatus of claim 6, wherein the actuating member includes an elongated rod that is pivotally attached to the responsive member of the slide adjuster.

8. The apparatus of claim 6,
 wherein the movement assisting device is slidably attached to the underside of the bottom wall of the wheelbarrow tray by two slides including a first slide and a second slide, and
 wherein the slide adjuster is positioned between the first and second slides.

9. The apparatus of claim 6,
 wherein the elongated actuating member includes a rod having a piston at or near the distal end of the rod, and
 wherein the responsive member includes a cylinder that receives the piston within the interior of the cylinder.

10. The apparatus of claim 9, wherein the slide adjuster further comprises:
 an adjusting plate fixedly attached to the bottom wall of the wheelbarrow tray, the adjusting plate having a threaded hole for receiving the rod of the actuating member,
 wherein the rod of the actuating member has an outer threaded portion that engages the threaded hole of the adjusting plate when the outer threaded portion of the rod of the actuating member is inserted through the threaded hole of the adjusting plate.

11. The apparatus of claim 10, wherein the outer threaded portion of the rod of the actuating member of the slide adjuster is engaged with the threaded hole of the adjusting plate.

12. The apparatus of claim 11,
 wherein rotation of the rod about a rotational axis that is aligned with the longitudinal axis of the rod causes the drive wheel to move in a forward or backward direction along a front-to-back axis of the wheelbarrow tray due to the engagement between the outer threaded portion of the rod of the actuating member and the threaded hole of the adjusting plate, and
 wherein the direction of movement of the drive wheel depends on the direction of rotation of the actuating member.

13. The apparatus of claim 6, wherein the elongated actuating member includes a handle at or near the proximal end of the actuating member for operation by a user.

14. A wheelbarrow comprising:
 a wheelbarrow tray, the wheelbarrow tray having a bottom wall and at least three side walls, wherein the bottom wall and the at least three side walls partially surround an interior containment space on the top side of the bottom wall for carrying a load;
 at least two handles attached to the wheelbarrow tray, each of the at least two handles having rearwardly extending portions for handling by a user;
 a front wheel mounted on a front wheel axle and attached to the wheelbarrow tray or the at least two handles via the front wheel axle; and
 a movement assisting device slidably attached to the underside of the bottom wall of the wheelbarrow tray by one or more slides, the movement assisting device comprising:
  a frame having at least two main frame members including a first main frame member and a second main frame member;
  a drive wheel rotationally mounted on a drive wheel axle, the drive wheel axle being attached to the frame;
  a drive motor rotationally coupled to the drive wheel to impart rotation to the drive wheel by the rotational action of the drive motor, the drive motor being fixedly attached to the frame; and
  a power or fuel source for providing power or fuel to the drive motor, the power or fuel source being fixedly attached to the frame,
 wherein each of the one or more slides comprises a sliding member and a stationary member, and wherein the sliding member of each slide is fixedly attached to the frame, and the stationary member of each slide is fixedly attached to the wheelbarrow tray.

15. The wheelbarrow of claim 14, wherein the front wheel is attached to the two wheelbarrow handles, such that a mid-plane of the front wheel is positioned approximately within a front-to-back center plane of the wheelbarrow.

16. The wheelbarrow of claim 14, wherein the wheelbarrow tray has at least four side walls including a front wall, a back wall, a first lateral side wall and a second lateral side wall.

17. The wheelbarrow of claim 14, wherein the drive wheel and the drive motor are generally aligned in their attachment to the frame of the apparatus, such that the drive wheel is located closer to the front wheel of the wheelbarrow than the drive motor.

18. The wheelbarrow of claim 14, wherein the drive motor is an electric motor, and wherein the power or fuel source is a battery.

19. The wheelbarrow of claim 14, wherein the drive motor is rotationally coupled to the drive wheel via a drive chain or a drive belt.

20. The wheelbarrow of claim 14, wherein the movement assisting device is slidably attached to the underside of the bottom wall of the wheelbarrow tray by two or more slides.

21. The wheelbarrow of claim 14, further comprising:
a slide adjuster, the slide adjuster comprising an elongated actuating member and a responsive member,
wherein the elongated actuating member is attached at or near the distal end of the elongated actuating member to the responsive member, and
wherein the responsive member is fixedly attached to the frame.

22. The wheelbarrow of claim 21, wherein the slide adjuster further comprises:
an adjusting plate fixedly attached to the bottom wall of the wheelbarrow tray, the adjusting plate having a threaded hole for receiving the rod of the actuating member,
wherein the elongated actuating member includes a rod having a piston at or near the distal end of the rod,
wherein the responsive member includes a cylinder that receives the piston within the interior of the cylinder, and
wherein the rod of the actuating member has an outer threaded portion that engages the threaded hole of the adjusting plate when the outer threaded portion of the rod of the actuating member is inserted through the threaded hole of the adjusting plate, and
wherein the outer threaded portion of the rod of the actuating member of the slide adjuster is engaged with the threaded hole of the adjusting plate.

23. A method for assisting in the operation of a wheelbarrow comprising:
(a) moving an actuating member of a slide adjuster of a movement assisting device until an outer contacting area of a drive wheel of the movement assisting device contacts and engages a front wheel of the wheelbarrow; and
(b) applying a torque to the front wheel of the wheelbarrow by the drive wheel, the torque being powered by a drive motor of the movement assisting device, the drive motor being rotationally coupled to the drive wheel,
wherein the wheelbarrow comprises:
a wheelbarrow tray, the wheelbarrow tray having a bottom wall and at least three side walls, wherein the bottom wall and the at least three side walls partially surround an interior containment space on the top side of the bottom wall for carrying a load;
at least two handles attached to the wheelbarrow tray, each of the at least two handles having rearwardly extending portions for handling by a user; and
the front wheel mounted on a front wheel axle and attached to the two wheelbarrow handles via the front wheel axle; and
wherein the movement assisting device comprises:
a frame having at least two main frame members including a first main frame member and a second main frame member;
the drive wheel rotationally mounted on a drive wheel axle, the drive wheel axle being attached to the frame;
the drive motor, the drive motor being fixedly attached to the frame;
a power or fuel source for providing power or fuel to the drive motor, the power or fuel source being fixedly attached to the frame,
one or more slides, each slide comprising a sliding member and a stationary member, the sliding member of each slide being fixedly attached to the frame, and the stationary member of each slide being fixedly attached to the wheelbarrow tray; and
the slide adjuster, the slide adjuster comprising the actuating member and a responsive member,
wherein the actuating member is elongated in shape and attached to the responsive member at or near a distal end of the actuating member, and wherein the responsive member is fixedly attached to the frame,
wherein a first mid-plane of the drive wheel is approximately aligned with a second mid-plane of the front wheel of the wheelbarrow, such that an outer contacting surface of the drive wheel contacts the front wheel of the wheelbarrow when engaged, and
wherein the movement assisting device is slidably attached to the underside of the bottom wall of the wheelbarrow tray by the one or more slides.

24. The method of claim 23, wherein the moving step (a) comprises:
rotating the actuating member in a first rotational direction to cause the outer contacting surface of the drive wheel to engage the front wheel of the wheelbarrow,
wherein the slide adjuster further comprises:
an adjusting plate fixedly attached to the bottom wall of the wheelbarrow tray or at least one of the handles of the wheelbarrow,
wherein the adjusting plate has a threaded hole for receiving the elongated actuating member, the elongated actuating member having an outer threaded portion that is engaged with the threaded hole of the adjusting plate.

25. The method of claim 24, further comprising:
(c) disengaging the drive wheel of the movement assisting device from the front wheel of the wheelbarrow by rotating the actuating member of the slide adjuster actuating member in a second rotational direction, the first and second rotational directions being in opposite directions.

26. The method of claim 23, further comprising:
(c) disengaging the drive wheel of the movement assisting device from the front wheel of the wheelbarrow by moving the actuating member of the slide adjuster such that the drive wheel moves away from the front wheel of a wheelbarrow.

27. The method of claim 23, further comprising:
(d) slidably attaching the movement assisting device to the underside of the wheelbarrow by engaging the sliding member of each of the one or more slides with the corresponding stationary member of the one or more slides,
wherein step (d) is performed prior to step (a).

* * * * *